United States Patent
Gschwind

(10) Patent No.: US 9,665,500 B2
(45) Date of Patent: *May 30, 2017

(54) SYSTEM SUPPORTING MULTIPLE PARTITIONS WITH DIFFERING TRANSLATION FORMATS

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/994,460

(22) Filed: Jan. 13, 2016

(65) Prior Publication Data

US 2016/0132436 A1    May 12, 2016

Related U.S. Application Data

(63) Continuation of application No. 13/646,779, filed on Oct. 8, 2012.

(51) Int. Cl.
*G06F 12/10* (2016.01)
*G06F 3/06* (2006.01)
(Continued)

(52) U.S. Cl.
CPC ......... *G06F 12/1009* (2013.01); *G06F 3/061* (2013.01); *G06F 3/0604* (2013.01); *G06F 3/0631* (2013.01); *G06F 3/0644* (2013.01); *G06F 3/0664* (2013.01); *G06F 3/0665* (2013.01); *G06F 3/0671* (2013.01);
(Continued)

(58) Field of Classification Search
CPC ............ G06F 12/1009; G06F 12/1018; G06F 12/109; G06F 12/0292; G06F 2212/151; G06F 9/45533; G06F 2009/45583
See application file for complete search history.

(56) References Cited

U.S. PATENT DOCUMENTS 4,356,549 A    10/1982   Chueh
4,456,954 A    6/1984    Bullions, III et al.
(Continued)

FOREIGN PATENT DOCUMENTS

EP    690386 A1       1/1996
EP    1959348 A2      12/2007
WO    2012129729 A1   10/2012

OTHER PUBLICATIONS

Final Office Action in U.S. Appl. No. 13/646,771, dated Sep. 22, 2015, pp. 1-41.
(Continued)

*Primary Examiner* — Gary W Cygiel
(74) *Attorney, Agent, or Firm* — William A. Kinnaman, Jr.; Matthew M. Hulihan; Heslin Rothenberg Farley & Mesiti, PC

(57) ABSTRACT

A system configuration is provided with multiple partitions that supports different types of address translation structure formats. The configuration may include partitions that use a single level of translation and those that use a nested level of translation. Further, differing types of translation structures may be used. The different partitions are supported by a single hypervisor.

12 Claims, 28 Drawing Sheets

(51) Int. Cl.
    *G06F 9/455*       (2006.01)
    *G06F 12/02*       (2006.01)
    *G06F 12/1009*     (2016.01)
    *G06F 12/1018*     (2016.01)
    *G06F 12/109*      (2016.01)
    *G06F 12/1027*     (2016.01)

(52) U.S. Cl.
    CPC ........ *G06F 3/0673* (2013.01); *G06F 9/45558* (2013.01); *G06F 12/0292* (2013.01); *G06F 12/109* (2013.01); *G06F 12/1018* (2013.01); *G06F 9/45533* (2013.01); *G06F 12/1027* (2013.01); *G06F 2009/45583* (2013.01); *G06F 2212/1016* (2013.01); *G06F 2212/151* (2013.01); *G06F 2212/657* (2013.01); *G06F 2212/7201* (2013.01); *G06F 2212/7202* (2013.01)

(56) References Cited

U.S. PATENT DOCUMENTS

| | | |
|---|---|---|
| 4,680,700 A | 7/1987 | Hester et al. |
| 4,876,646 A | 10/1989 | Gotou et al. |
| 5,226,168 A | 7/1993 | Kobayashi et al. |
| 5,854,913 A | 12/1998 | Goetz et al. |
| 6,393,544 B1 | 5/2002 | Bryg et al. |
| 6,430,670 B1 | 8/2002 | Bryg et al. |
| 6,671,791 B1 | 12/2003 | McGrath |
| 6,895,491 B2 | 5/2005 | Kjos et al. |
| 7,089,377 B1 | 8/2006 | Chen |
| 7,111,145 B1 | 9/2006 | Chen et al. |
| 7,395,405 B2 | 7/2008 | Anderson et al. |
| 7,428,626 B2 | 9/2008 | Vega |
| 7,752,417 B2 | 7/2010 | Manczak et al. |
| 7,822,941 B2 | 10/2010 | Vick et al. |
| 7,827,381 B2 | 11/2010 | Manczak et al. |
| 8,078,827 B2 | 12/2011 | Uhlig et al. |
| 8,086,822 B2 | 12/2011 | Devine et al. |
| 8,103,851 B2 | 1/2012 | Greiner et al. |
| 8,127,098 B1 | 2/2012 | Klaiber et al. |
| 8,135,937 B2 | 3/2012 | Hall et al. |
| 8,225,071 B2 | 7/2012 | Chen et al. |
| 8,244,978 B2 | 8/2012 | Kegel et al. |
| 8,386,747 B2 | 2/2013 | Moyer et al. |
| 2004/0210588 A1 | 10/2004 | Simkins et al. |
| 2005/0193165 A1 | 9/2005 | Sakaguchi et al. |
| 2006/0064567 A1 | 3/2006 | Jacobson et al. |
| 2006/0075146 A1 | 4/2006 | Schoinas et al. |
| 2007/0101099 A1 | 5/2007 | Shinohara et al. |
| 2007/0283123 A1 | 12/2007 | Vick et al. |
| 2007/0283125 A1 | 12/2007 | Manczak et al. |
| 2007/0294502 A1 | 12/2007 | Gunther |
| 2008/0086620 A1 | 4/2008 | Morris |
| 2008/0104362 A1 | 5/2008 | Buros et al. |
| 2008/0162864 A1 | 7/2008 | Sugumar et al. |
| 2008/0189506 A1 | 8/2008 | Kopec et al. |
| 2009/0037906 A1 | 2/2009 | Armstrong et al. |
| 2009/0037941 A1 | 2/2009 | Armstrong et al. |
| 2009/0113164 A1 | 4/2009 | Rajamony et al. |
| 2009/0172341 A1 | 7/2009 | Durham et al. |
| 2009/0228882 A1 | 9/2009 | Wang et al. |
| 2009/0327648 A1 | 12/2009 | Savagaonkar et al. |
| 2010/0011187 A1 | 1/2010 | Schoinas et al. |
| 2010/0058358 A1 | 3/2010 | Franke et al. |
| 2010/0125708 A1 | 5/2010 | Hall et al. |
| 2010/0125709 A1 | 5/2010 | Hall et al. |
| 2010/0180276 A1 | 7/2010 | Jiva |
| 2010/0250499 A1 | 9/2010 | Mcalister et al. |
| 2010/0250869 A1 | 9/2010 | Adams et al. |
| 2010/0318761 A1 | 12/2010 | Moyer et al. |
| 2011/0016290 A1 | 1/2011 | Chobotaro et al. |
| 2011/0078388 A1 | 3/2011 | Gyuris et al. |
| 2011/0153909 A1 | 6/2011 | Dong |
| 2011/0197004 A1 | 8/2011 | Serebrin et al. |
| 2011/0239268 A1 | 9/2011 | Sharp et al. |
| 2011/0283040 A1 | 11/2011 | Chadha et al. |
| 2011/0320756 A1 | 12/2011 | Craddock et al. |
| 2011/0320758 A1 | 12/2011 | Craddock et al. |
| 2011/0320759 A1 | 12/2011 | Craddock et al. |
| 2011/0321158 A1 | 12/2011 | Craddock et al. |
| 2012/0011341 A1 | 1/2012 | Greiner et al. |
| 2012/0023300 A1 | 1/2012 | Tremaine et al. |
| 2012/0079479 A1 | 3/2012 | Hakewill |
| 2012/0110236 A1 | 5/2012 | Ali et al. |
| 2012/0137106 A1 | 5/2012 | Greiner et al. |
| 2012/0137288 A1 | 5/2012 | Barrett et al. |
| 2012/0159039 A1 | 6/2012 | Kegel et al. |
| 2012/0180047 A1 | 7/2012 | Cardona et al. |
| 2012/0185854 A1 | 7/2012 | Dahlstedt |
| 2012/0191940 A1 | 7/2012 | Brownlow et al. |
| 2012/0209894 A1 | 8/2012 | Kandasamy et al. |
| 2013/0024598 A1 | 1/2013 | Serebrin et al. |
| 2014/0047251 A1 | 2/2014 | Kottilingal et al. |
| 2014/0101359 A1 | 4/2014 | Bybell et al. |
| 2014/0101360 A1 | 4/2014 | Gschwind |
| 2014/0101361 A1 | 4/2014 | Gschwind |
| 2014/0101362 A1 | 4/2014 | Gschwind |
| 2014/0101363 A1 | 4/2014 | Gschwind |
| 2014/0101364 A1 | 4/2014 | Gschwind |
| 2014/0101365 A1 | 4/2014 | Gschwind |
| 2014/0101402 A1 | 4/2014 | Gschwind |
| 2014/0101404 A1 | 4/2014 | Bybell et al. |
| 2014/0101406 A1 | 4/2014 | Gschwind |
| 2014/0101407 A1 | 4/2014 | Bybell et al. |
| 2014/0101408 A1 | 4/2014 | Bybell et al. |
| 2014/0108701 A1 | 4/2014 | Liljeberg |

OTHER PUBLICATIONS

Notice of Allowance in U.S. Appl. No. 13/646,770, dated Sep. 23, 2015, pp. 1-19.
Notice of Allowance in U.S. Appl. No. 13/784,082, dated Sep. 24, 2015, pp. 1-7.
Office Action in U.S. Appl. No. 13/788,895, dated Oct. 6, 2015, pp. 1-13.
Final Office Action in U.S. Appl. No. 13/646,773, dated Oct. 7, 2015, pp. 1-17.
Final Office Action in U.S. Appl. No. 13/789,101, dated Oct. 7, 2015, pp. 1-13.
Office Action in U.S. Appl. No. 13/646,788, dated Oct. 8, 2015, pp. 1-17.
Notice of Allowance in U.S. Appl. No. 13/646,782, dated Oct. 23, 2015, pp. 1-10.
"z/Architecture—Principles of Operation", Publication No. SA22-7832-08, 9th Edition, Aug. 2010.
Power ISATM Version 2.06 Revision B specification, Jul. 23, 2010.
Intel Itanium Architecture Software Developer's Manual vol. 2: System Architecture, Document No. 245318-005, Jan. 2006.
Peng, C. Ray et al., "The Power PC Architecture: 64-Bit Power with 32-Bit Compatibility," pp. 300-307, 1995 (no further date information available).
Hang, Giang et al., "A Case for Alternative Nesting Paging Models for Virtualized Systems," IEEE Computer Architecture Letters, Jan.-Jun. 2010, vol. 9, No. 1, pp. 17-20.
Barr, Thomas et al., "Translation Caching: Skip, Don't Walk (the Page Table)," ISCA '10, Jun. 2010, pp. 48-59.
Bybell, Anthony et al., "Asymmetric Co-Existent Address Translation Structure Formats," U.S. Appl. No. 13/646,770, filed Oct. 8, 2012.
Bybell, Anthony et al., "Selectable Address Translation Mechanisms," U.S. Appl. No. 13/646,771, filed Oct. 8, 2012.
Gschwind, Michael K., "Adjunct Component to Provide Full Virtualization Using Paravirtualized Hypervisors," U.S. Appl. No. 13/646,773, filed Oct. 8, 2012.
Gschwind, Michael K., "Supporting Multiple Types of Guests by a Hypervisor," U.S. Appl. No. 13/646,782, filed Oct. 8, 2012.
Gschwind, Michael K., "Selectable Address Translation Mechanisms within a Partition," U.S. Appl. No. 13/646,788, filed Oct. 8, 2012.

(56) References Cited

OTHER PUBLICATIONS

Gschwind, Michael K. "System Supporting Multiple Partitions With Differing Translation Formats," U.S. Appl. No. 13/646,779, filed Oct. 8, 2012.
International Search Report and Written Opinion for PCT/US2013/063675, dated Jan. 22, 2014, pp. 1-11.
International Search Report and Written Opinion for PCT/US2013/63651, dated Apr. 21, 2014, pp. 1-9.
Final Office Action for U.S. Appl. No. 13/646,770 dated Nov. 19, 2014, pp. 1-22.
Final Office Action for U.S. Appl. No. 13/789,148 dated Nov. 19, 2014, pp. 1-20.
Office Action for U.S. Appl. No. 13/789,124 dated Dec. 2, 2014, pp. 1-17.
Office Action for U.S. Appl. No. 13/646,771 dated Dec. 15, 2014, pp. 1-30.
Office Action for U.S. Appl. No. 13/646,770 dated Jun. 18, 2014, pp. 1-18.
Office Action for U.S. Appl. No. 13/789,148 dated Jun. 19, 2014, pp. 1-16.
Office Action for U.S. Appl. No. 13/646,771 dated Jul. 10, 2014, pp. 1-22.
Ben-Yehuda, Muli, et al., "The Turtles Project: Design and Implementation of Nested Virtualization," IBM Research Report H-0282 (H1001-004), Jan. 9, 2010, pp. 1-14.
Office Action for U.S. Appl. No. 13/789,124 dated Aug. 12, 2014, pp. 1-17.
Office Action for U.S. Appl. No. 13/646,779 dated Oct. 8, 2014, pp. 1-26.
Office Action for U.S. Appl. No. 13/646,788 dated Oct. 8, 2014, pp. 1-23.
Office Action for U.S. Appl. No. 13/788,895 dated Oct. 8, 2014, pp. 1-17.
Office Action for U.S. Appl. No. 13/646,773 dated Mar. 25, 2015, pp. 1-23.
Office Action for U.S. Appl. No. 13/789,101 dated Mar. 26, 2015, pp. 1-17.
Office Action for U.S. Appl. No. 13/646,782 dated Apr. 9, 2015, pp. 1-25.
Office Action for U.S. Appl. No. 13/789,083 dated Apr. 9, 2015, pp. 1-19.
Office Action for U.S. Appl. No. 13/646,771 dated Apr. 9, 2015, pp. 1-44.
Final Office Action for U.S. Appl. No. 13/646,788 dated May 5, 2015, pp. 1-16.
Final Office Action for U.S. Appl. No. 13/646,779 dated May 6, 2015, pp. 1-21.
Final Office Action for U.S. Appl. No. 13/788,895 dated May 6, 2015, pp. 1-13.
Notice of Allowance for U.S. Appl. No. 13/789,148 dated Jul. 16, 2015, pp. 1-7.
Notice of Allowance in U.S. Appl. No. 13/789,083, dated Dec. 4, 2015, pp. 1-14.
Non-Final Office Action in U.S. Appl. No. 13/646,771, dated May 11, 2016, 41 pgs.
Notice of Allowance in U.S. Appl. No. 13/646,773, dated Jan. 15, 2016, pp. 1-14.
Notice of Allowance in U.S. Appl. No. 13/646,779, dated Jan. 15, 2016, pp. 1-9.
Notice of Allowance in U.S. Appl. No. 13/646,782, dated Jan. 19, 2016, pp. 1-14.
Office Action in U.S. Appl. No. 13/789,101, dated Feb. 1, 2016, pp. 1-24.
Final Office Action in U.S. Appl. No. 13/788,895, dated Mar. 16, 2016, pp. 1-20.
Final Office Action in U.S. Appl. No. 13/646,788, dated Mar. 17, 2016, pp. 1-24.
Office Action in U.S. Appl. No. 14/993,136, dated Mar. 25, 2016, pp. 1-35.
Notice of Allowance in U.S. Appl. No. 13/789,101, dated May 20, 2016, pp. 1-13.
Wang et al., Dynamic memory paravirtualization transparent to guest OS, Jan. 2010, Science in China, 12 pages.
Notice of Allowance in U.S. Appl. No. 13/646,771, dated Nov. 4, 2016, 14 pgs.
Office Action in U.S. Appl. No. 13/788,895, dated Jun. 29, 2016, 13 pgs.
Office Action in U.S. Appl. No. 13/646,788, dated Jun. 30, 2016, 17 pgs.
Final Office Action in U.S. Appl. No. 14/993,136, dated Sep. 6, 2016, 13 pgs.
Final Office Action in U.S. Appl. No. 13/646,788, dated Jan. 10, 2017, 12 pgs.
Final Office Action in U.S. Appl. No. 13/788,895, dated Jan. 10, 2017, 9 pgs.
Corrected Notice of Allowability in U.S. Appl. No. 13/789,148, dated Apr. 4, 2016, pp. 1-26.
Corrected Notice of Allowability in U.S. Appl. No. 13/789,148, dated Apr. 28, 2016, pp. 1-9.
Notice of Allowance in U.S. Appl. No. 13/646,779, dated Sep. 30, 2015, pp. 1-7.
Notice of Allowance in U.S. Appl. No. 13/789,083, dated Oct. 23, 2015, pp. 1-10.
Final Office Action in U.S. Appl. No. 13/784,082, dated May 5, 2015, pp. 1-17.
Office Action in U.S. Appl. No. 13/784,082, dated Oct. 8, 2014, 20 pgs.
International Search Report in related Application No. PCT/US2013/063672, dated Jan. 28, 2014, pp. 1-2.
Nakajima et al., "Hybrid Virtualization: Enhanced Virtualization for Linux", Proceedings of the Linux Symposium, 2007, vol. 2, pp. 87-96.
International Preliminary Report on Patentablility and Written Opinion in related Application No. PCT/US2013/063672, dated Apr. 8, 2015, pp. 1-5.
Notice of Allowance in U.S. Appl. No. 13/784,082, dated Dec. 7, 2015, pp. 1-14.

SYSTEM SUPPORTING MULTIPLE PARTITIONS WITH DIFFERING TRANSLATION FORMATS

BACKGROUND

One or more aspects relate, in general, to memory of a computing environment, and in particular, to facilitating access to the memory.

System configurations include physical memory used to store applications and data. The amount of physical memory is fixed and often inadequate to support the needs of users. Therefore, to provide additional memory or at least the appearance of additional memory, a memory management technique, referred to as virtual memory, is utilized. Virtual memory uses virtual addressing, which provides ranges of addresses that can appear to be much larger than the physical size of main memory.

To access main memory in a system configuration that includes virtual memory, a memory access is requested that includes an effective address. The effective address is translated into a real address used to access the physical memory.

Translation is performed using an address translation technique. Several address translation techniques are available. For instance, in PowerPC systems offered by International Business Machines Corporation, an effective address is translated to a corresponding real address by way of page table entries found by selecting an effective segment identifier (ESID) table entry associated with the effective address, and using the entry to locate a group of page table entries by way of a hashing algorithm. In a further example, in the z/Architecture, also offered by International Business Machines Corporation, an effective address is translated to a corresponding real address by way of a hierarchy of translation tables. Translation tables are indexed by a portion of the effective address to find the address of the next translation table of the hierarchy until a real (or absolute) address is obtained. Both address translation techniques provide advantages to their respective operating systems.

BRIEF SUMMARY

Shortcomings of the prior art are overcome and additional advantages are provided through the provision of a method of facilitating memory access. The method includes, for instance, providing a first partition within a system configuration, the first partition configured to support an operation system (OS) designed for a first address translation architecture, the first partition not supporting an OS designed for a second address translation architecture; and providing a second partition within the system configuration, the second partition configured to support the OS designed for the second address translation architecture, the second partition not supporting the OS designed for the first address translation architecture, wherein the first address translation architecture is structurally different from the second address translation architecture.

Computer program products and systems relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1A:
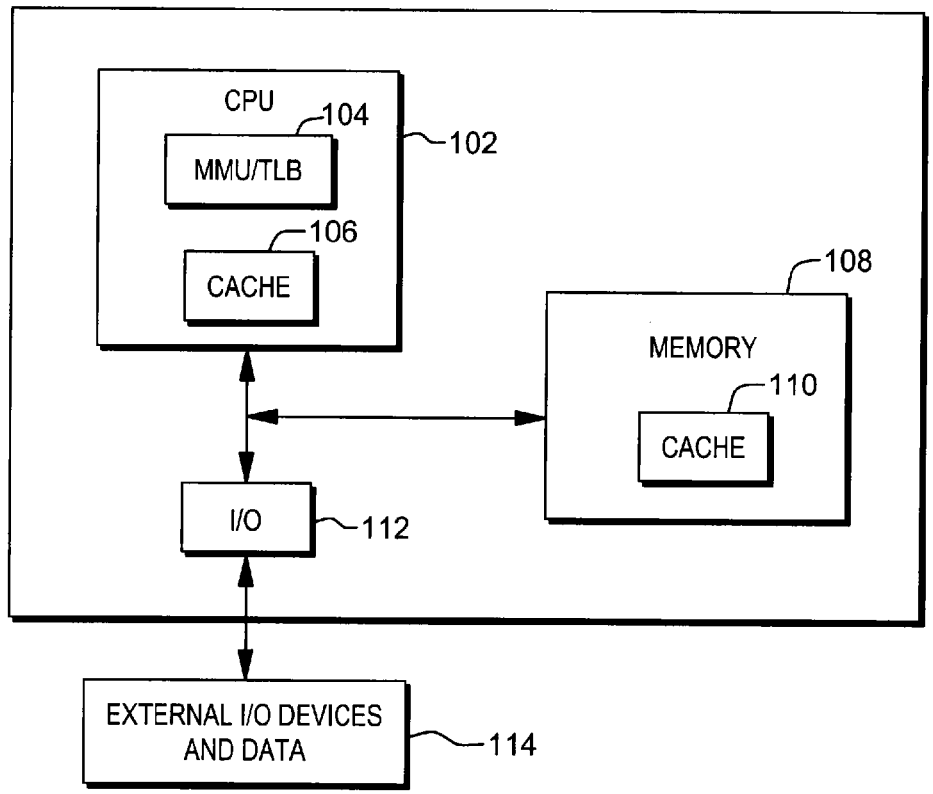
FIG. 1A depicts one example of a computing environment.

In one aspect, a system configuration is provided that has different types of translation structures available to it for use in translating memory addresses from one format (e.g., an effective address, and in particular, a virtual address associated therewith) to another format (e.g., a real address). Multiple translation structure formats (e.g., multiple page table formats, such as hash page tables and hierarchical page tables) are concurrently supported in a system configuration. In one embodiment, the different types of translation structures are structurally different, and include, for instance, hash structures, hierarchical structures and/or offset structures, which are described herein.

Further, in one aspect, a system configuration is provided that includes multiple partitions that have differing translation mechanisms associated therewith. For instance, one partition has associated therewith a single level translation mechanism for translating guest virtual addresses to host physical addresses, and another partition has a nested level translation mechanism for translating guest virtual addresses to host physical addresses. The different translation mechanisms and partitions are supported by a single hypervisor. The hypervisor is, for instance, a paravirtualized hypervisor. Thus, in one aspect, faults, including host translation faults, associated with address translation of guest memory addresses in a single level translation mechanism are managed, at least in part, by the guest operating system. However, full virtualization is also provided for those partitions using nested level translations of guest memory addresses. The host translation faults are handled entirely by the host without (or independent of) assistance from the guest operating system. With full virtualization, the guest operating system is not involved in managing address translation faults resulting from host level translations. To support full virtualization by a paravirtualization hypervisor, an adjunct component is provided that facilitates handling of address translation faults resulting from host level translations. As used herein, an adjunct component is a helper component connected, added or coupled to an entity, typically in an auxiliary manner, and not limited to any specific adjunct architecture.

Computing environments of different architectures may incorporate and use one or more aspects provided herein. For instance, environments based on the PowerPC architecture, also referred to as Power ISA, offered by International Business Machines Corporation and described in the Power ISA™ Version 2.06 Revision B specification, Jul. 23, 2010, incorporated herein by reference in its entirety, may include one or more aspects, as well as computing environments of other architectures, such as the z/Architecture, offered by International Business Machines Corporation, and described in z/Architecture—Principles of Operation, Publication No. SA22-7932-08, 9th Edition, August 2010, which is hereby incorporated herein by reference in its entirety.

One example of a computing environment to incorporate and use one or more aspects is described with reference to FIG. 1A. In one example, a computing environment 100 includes a processor (central processing unit—CPU) 102 that includes at least one memory management unit (MMU)/translation lookaside buffer (TLB) portion 104 and a cache 106. Processor 102 is communicatively coupled to a memory portion 108 having a cache 110, and to an input/output (I/O) portion 112. I/O portion 112 is communicatively coupled to external I/O devices 114 that may include, for example, data input devices, sensors and/or output devices, such as displays.

Memory management unit 104 is used in managing memory portion 108 including facilitating access to the memory by providing address translation. To improve address translation, the memory management unit utilizes a translation lookaside buffer (TLB). The TLB is a cache of previously translated addresses. Thus, when a request is received for a memory access that includes an address to be translated, the TLB is checked first. If the address and its translation are in the TLB, then no translation is necessary. Otherwise, the received address is translated using one of any number of translation techniques.

Figure 1B:
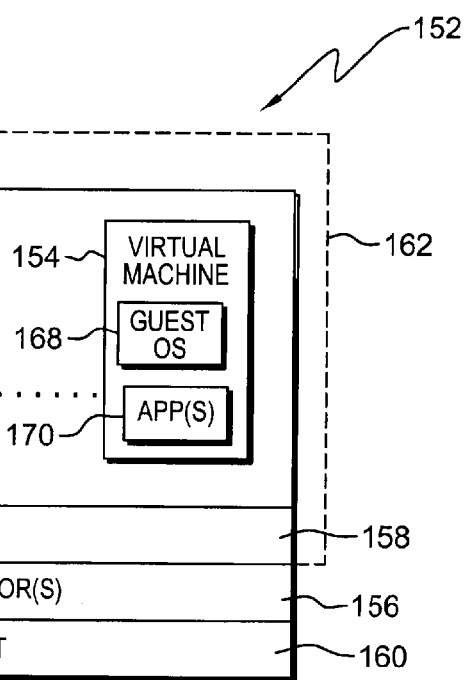
FIG. 1B depicts another example of a computing environment.

A further embodiment of a computing environment to incorporate and use one or more aspects of the present invention is depicted in FIG. 1B. In this example, a computing environment 150 includes a server 152 that includes, for instance, one or more virtual machines 154, one or more central processors (e.g., central processing units) 156, at least one hypervisor 158, and an input/output subsystem 160. The virtual machines and hypervisor are included in memory 162.

In this embodiment, each virtual machine is capable of hosting a guest operating system 168 and may be executing one or more applications 170. An operating system or application running in a virtual machine appears to have access to a full complete system, but in reality, only a portion of it is available.

Central processors 156 (e.g., central processing units) are physical processor resources that are assignable to a virtual machine. For instance, virtual machine 154 includes one or more logical processors, each of which represents all or a share of a physical processor 156 that may be dynamically allocated to the virtual machine. Virtual machines 154 are managed by hypervisor 158, such as PowerVM, offered by International Business Machines Corporation, as examples.

Central processor 156, like CPU 102, includes at least one MMU/TLB portion and at least one cache.

Input/output subsystem 160 directs the flow of information between devices and memory (also referred to herein as main memory or main storage). It is coupled to the server in that it can be part of the server or separate therefrom. The I/O subsystem relieves the central processors of the task of communicating directly with the I/O devices coupled to the server and permits data processing to proceed concurrently with I/O processing.

Figure 2A:
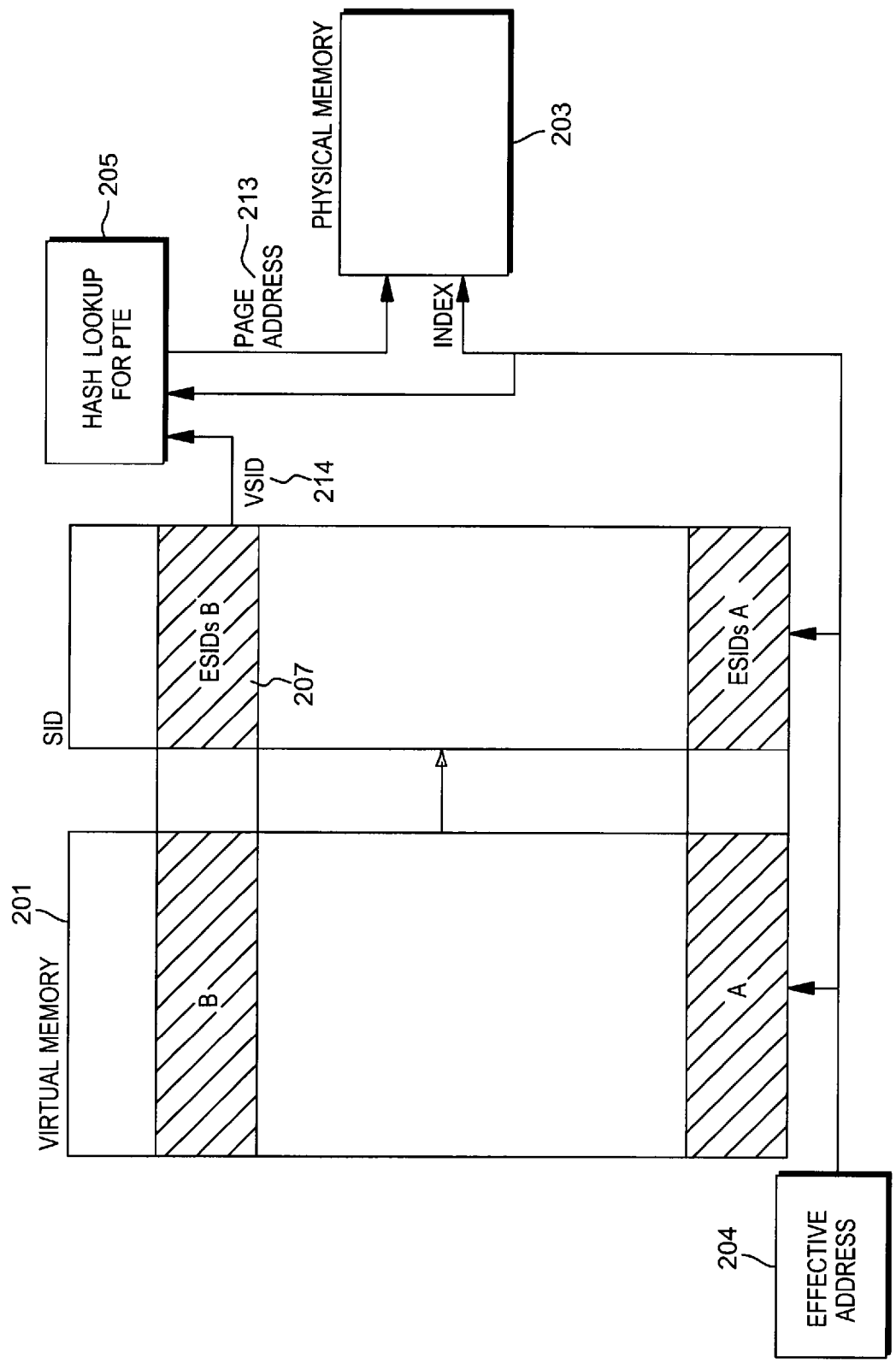
FIG. 2A illustrates an example of a high-level view of a virtual memory mapped to a physical memory using a hash page table technique.

Further details regarding the physical memory used by either system, such as memory 108 or memory 162, and access thereto are described with reference to FIG. 2A. As is known, physical memory is of a defined size and in order to have the physical memory appear larger than it is, virtual memory is utilized. One example of a high-level view of virtual memory 201 mapped to a physical memory 203 (such as memory 108, 162) is depicted in FIG. 2A. In this example, the mapping from virtual memory to real memory is via a hash page table (HPT) technique 205 to locate page table entries (PTEs), as used by, for example, Power ISA. In this example, programs only use sections A and B of the virtual memory. Each segment of the virtual memory is mapped to a segment ID (SID) entry 207 identified by an effective segment ID (ESID) (ESIDs for B and ESIDs for A included). An "effective address" 204 used by the program selects an SID entry, which includes the ESID value, as well as a virtual segment ID (VSID) 214 value. The VSID value represents the high-order bits of a virtual address to be used by hashing algorithm 205 to search the hash page table. A hashed value based on the VSID is used to locate a page table entry (PTE). The page table entry includes an address 213 of a page of physical memory 203.

Figure 2B:
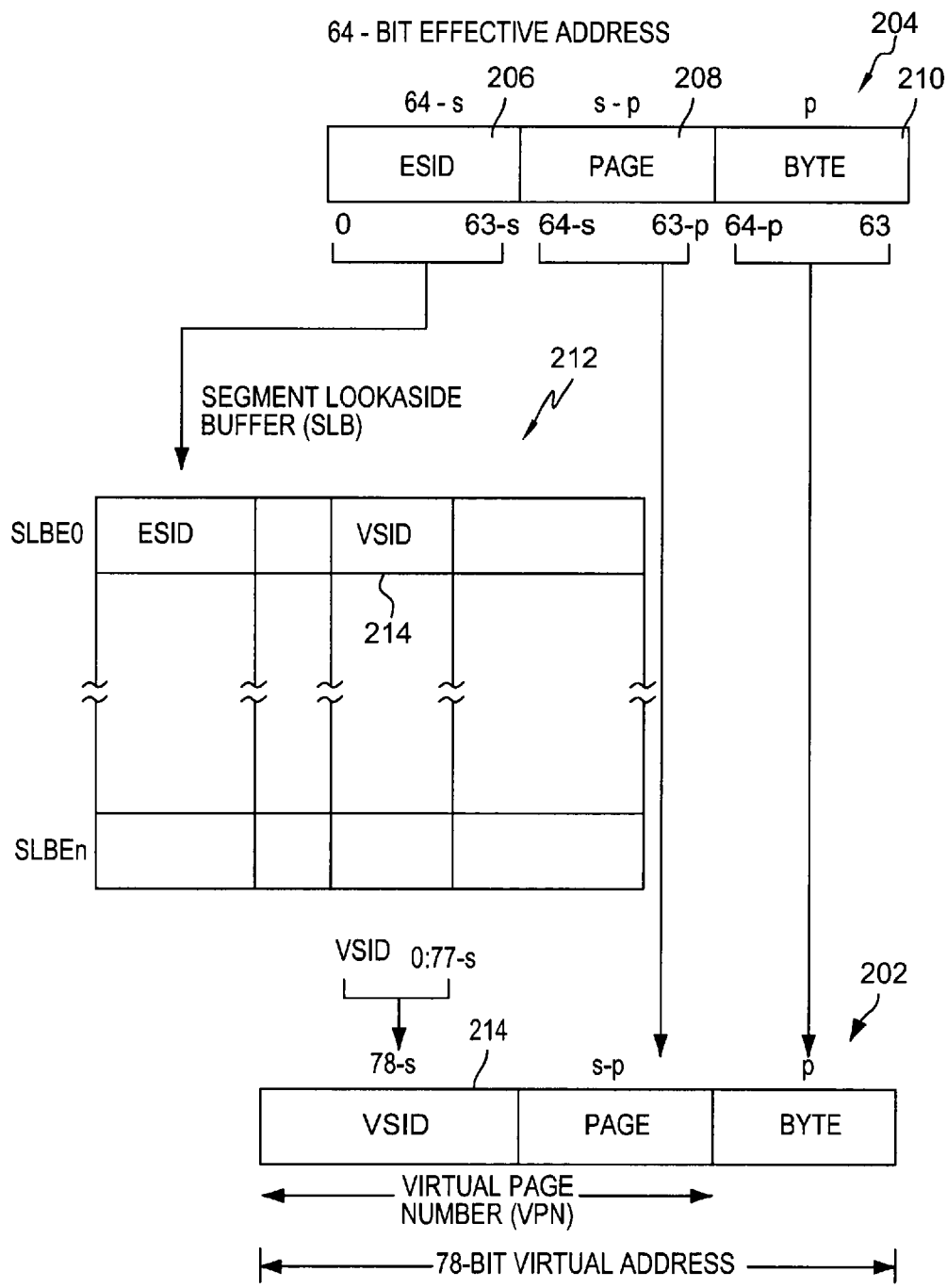
FIG. 2B illustrates one example of a technique for generating a virtual address.

FIG. 2B illustrates an example of a technique for generating a virtual address 202 for hashing. In this regard, an effective address 204 is received in, for instance, a memory management unit of a processor. Effective address 204 includes an effective segment identifier (ESID) field 206, a page field 208 and byte offset field 210. The ESID field is used to locate an entry in a segment lookaside buffer (SLB) 212, which is a cache of recently accessed segment ID entries. In particular, the SLB is searched for an entry with a value of ESID 206 of the effective address 204. The entry with the ESID 206 includes an associated virtual segment identifier (VSID) 214, as well as other information, as described below. The associated VSID is used to generate virtual address 202, which includes VSID 214; and page 208 and byte 210 from the effective address 204. Virtual address 202 is used to obtain a real address used to access physical memory in the memory system. In this disclosure, the terms physical memory, real memory, system memory and absolute memory are used interchangeably to refer to the main storage accessible to a processor.

Figure 2C:
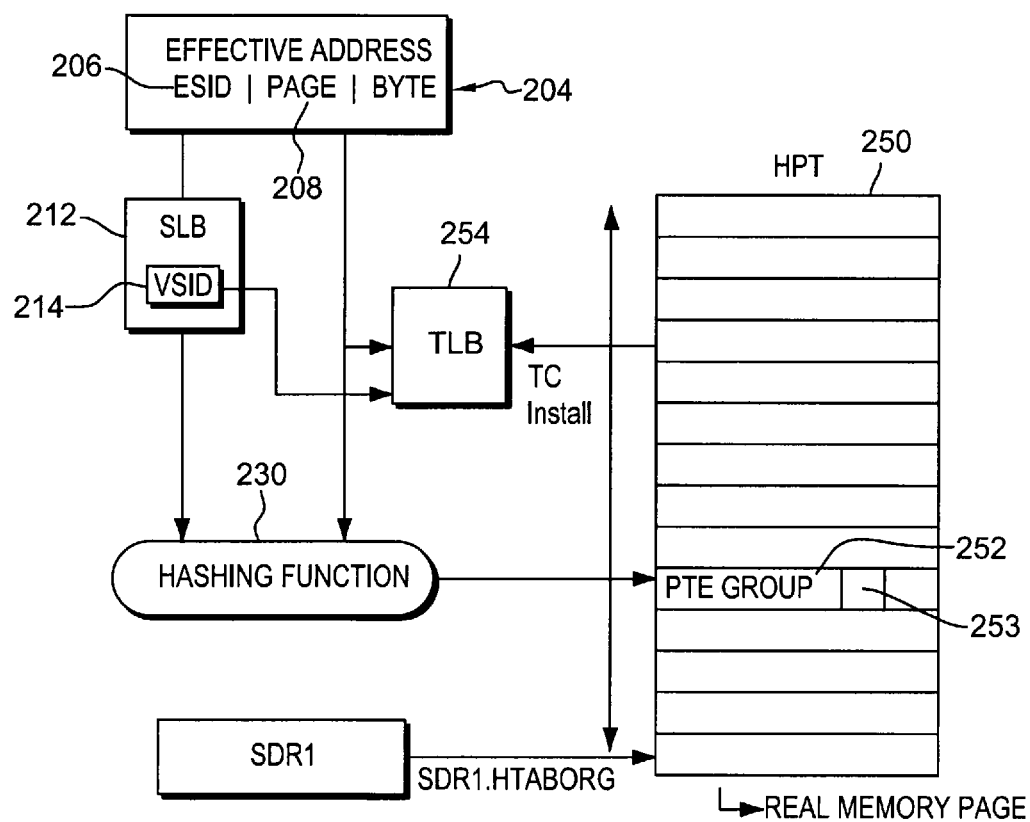
FIG. 2C depicts one example of a hash page table translation structure.

FIG. 2C illustrates an example of a hash page table (HPT) translation structure used by Power ISA. ESID portion 206 of an effective address (EA) 204 is used to locate an entry in SLB 212. The entry includes a VSID field 214. The value of VSID field 214 and a portion of EA 204 (page.byte) are hashed 230 to produce a hash value that is used to locate a page table entry (PTE) group 252 in a hash page table (HPT) 250. Page table entries 253 of PTE group 252 are searched to locate a corresponding PTE having a field matching a value of a most-significant-portion of the VSID. When a corresponding PTE is found, the address (e.g., real address) of the physical memory page in the PTE is used to access physical memory. In order to improve performance, once a PTE entry is found, the page portion 208 of EA 204 and the address of the physical memory page found in the PTE are stored in TLB 254, such that further accesses to the same EA page will "hit" in TLB 254 and avoid the PTE search. The page table is located by a page table origin address provided by the processor.

Figure 3:
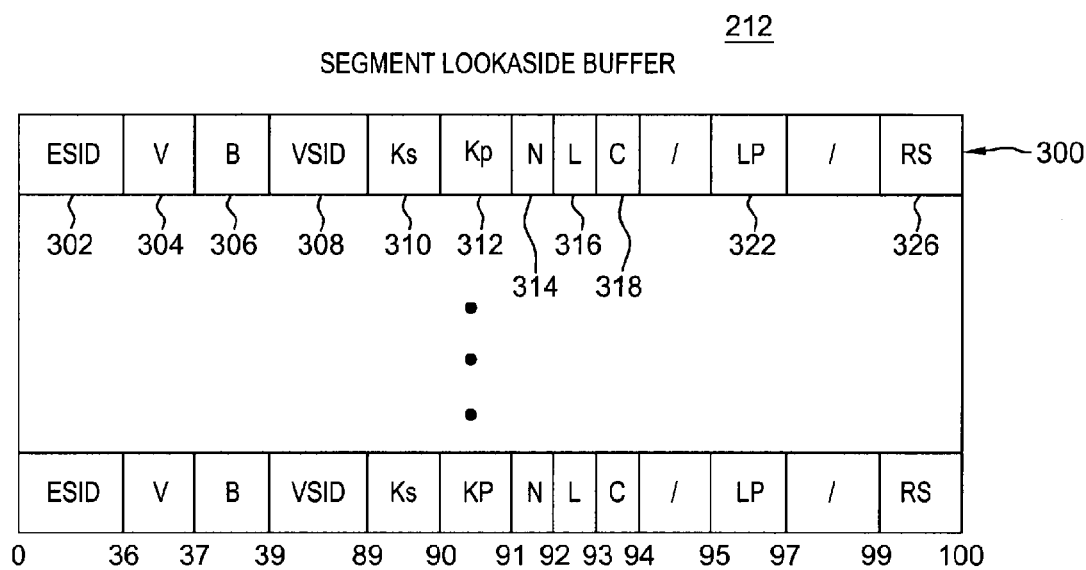
FIG. 3 depicts one example of a segment lookaside buffer, including example fields of a segment lookaside buffer entry.

Further details regarding a segment lookaside buffer and a page table are described with reference to FIGS. 3 and 4A-4B. Referring initially to FIG. 3, a segment lookaside buffer (SLB) 212 specifies the mapping between effective segment IDs (ESIDs) and virtual segment IDs (VSIDs). The number of SLB entries (SLBE) in an SLB is implementation dependent, and in one example, includes at least 32 entries. In one example, segment lookaside buffer 212 includes a plurality of SLB entries 300, and each SLB entry 300 maps one ESID 302 to one VSID 308. In one example, SLBE 300 includes the following fields:

Effective segment ID (ESID) 302 (bits 0-35);
Entry valid indicator (V) 304 (bit 36) which indicates whether the entry is valid (V=1) or invalid (V=0);
Segment sized selector (B) 306 (bits 37-38), which has the following meaning, in one example: 0b00-256 Megabytes (MB) (s=28), 0b01-1 Terabyte (TB) (s=40), 0b10-256 TB (s=48), and 0b11—reserved;
Virtual segment ID (VSID) 308 (bits 39-88);
Supervisor (privileged) state storage key ($K_s$) 310 (bit 89);
Problem state storage key ($K_r$) 312 (bit 90);
No-execute segment if N=1 indicator (N) 314 (bit 91);
Virtual page size selector bit 0 (L) 316 (bit 92);
Class indicator (C) 318 (bit 93);
Virtual page size selector bits 1:2 (LP) 322 (bits 95-96); and
Radix segment indicator (RS) 326 (bit 99), which, in one example, 0 indicates disabled and 1 indicates enabled. When RS=1, the virtual address used for the hash page table search has the lowest S (encoded in SLBEB) number of bits set to zero.

In one embodiment, instructions cannot be executed from a no-execute (N=1) segment. Segments may contain a mixture of page sizes. The L and LP bits specify the base virtual page size that the segment may contain. The $SLB_{L\psi, LP}$ encodings are those shown below, in one example:

| encoding | base page size |
|---|---|
| 0b000 | 4 KB |
| 0b101 | 64 KB |
| additional values | $2^b$ bytes, where b >12 and b may differ among encoding values, | where the "additional values" are implementation-dependent, as are the corresponding base virtual page sizes. The values that are not supported by a given implementation are reserved in that implementation.

The base virtual page size also referred to as the base page size is the smallest virtual page size for the segment. The base virtual page size is $2^b$ bytes. The actual virtual page size (also referred to as the actual page size or virtual page size) is specified by $PTEL_{L\psi, LP}$.

The Class field is used in conjunction with the SLB Invalidate Entry (SLBIE) and SLB Invalidate All (SLBIA) instructions. Class refers to a grouping of SLB entries and implementation-specific lookaside information so that only entries in a certain group need be invalidated and others might be preserved. The class value assigned to an implementation-specific lookaside entry derived from an SLB entry is to match the class value of that SLB entry. The class value assigned to an implementation-specific lookaside entry that is not derived from an SLB entry (such as real mode address translations) is 0.

Software is to ensure that the SLB contains at most one entry that translates a given instruction effective address. An attempt to create an SLB entry that violates this requirement may cause a machine check.

As described herein, at least one field of the SLB is used to access a page table, and in particular, a specific page table entry. Further information regarding a page table and page table entries is described with reference to FIGS. 4A-4B. In this example, the page table and its corresponding entries are for the Power ISA architecture; however, other page tables and entries may be used for other architectures.

Figure 4A:
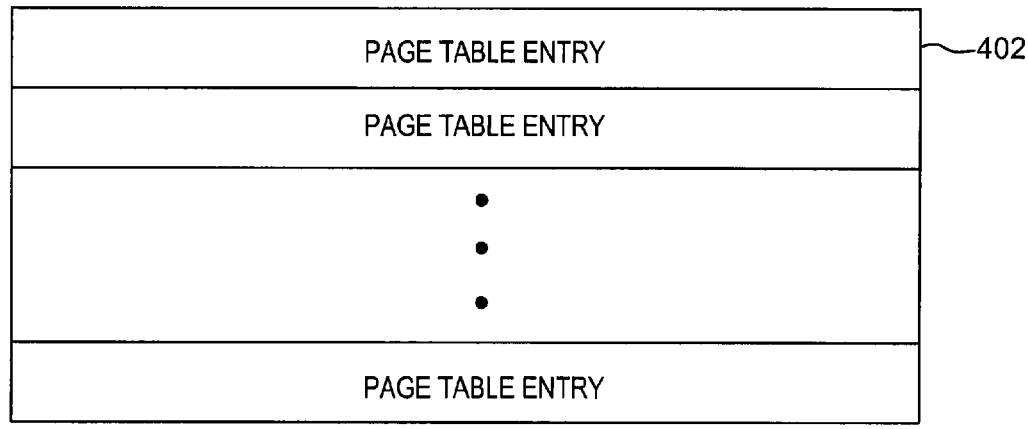
FIG. 4A depicts one example of a page table.
Figure 4B:
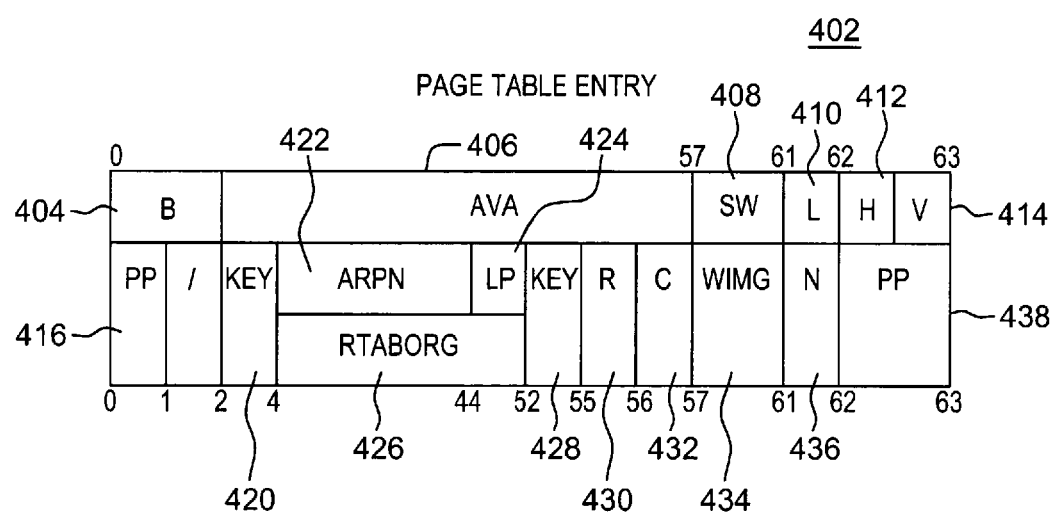
FIG. 4B depicts one example of a page table entry.

Referring initially to FIG. 4A, a page table 400 includes one or more page table entries 402. As one example, page table 400 is a hash page table (HPT), which is a variable-sized data structure that specifies the mapping between virtual page numbers (VPN) and real page numbers (RPN), where the real page number of a real page is, for instance, bits 0:47 of the address of the first byte in the real page. The hash page table size can be any size 2" bytes where 18≤n≤46. The hash page table is to be located in storage having the storage control attributes that are used for implicit accesses to it. In one embodiment, the starting address is to be a multiple of its size unless the implementation supports a server.relaxed page table alignment category, in which case its starting address is a multiple of $2^{18}$ bytes, as an example.

In one example, the hash page table contains page table entry groups (PTEGs). A page table entry group contains, for instance, eight page table entries of 16 bytes each; each page table entry group is thus 128 bytes long. PTEGs are entry points for searches of the page table.

Further details of a page table entry are described with reference to FIG. 4B. Each page table entry 402 maps one virtual number to one real page number. As an example for the Power ISA architecture, a page table entry includes the following:

| Dword | Bit(s) | Name | Description |
|---|---|---|---|
| 0 | 0:1 | B (404) | Segment Size |
|   |   |   | 0b00—256 MB; 0b01—1 TB; |
|   |   |   | 0b10—256 TB; 0b11—reserved |
|   | 2:56 | AVA (406) | Abbreviated Virtual Address |
|   | 57:60 | SW (408) | Available for software use |
|   | 61 | L (410) | Virtual page size |
|   |   |   | 0b0—4 KB |
|   |   |   | 0b1—greater than 4 KB (large page) |
|   | 62 | H (412) | Hash function identifier |
|   | 63 | V (414) | Entry valid (V = 1) or invalid (V = 0) |
| 1 | 0 | PP (416) | Page Protection bit 0 |
|   | 1 | / | Reserved |
|   | 2:3 | Key (420) | KEY bits 0:1 |
|   | 4:43 | ARPN (422) | Abbreviated Real Page Number |
|   | 44:51 | LP (424) | Large page size selector |
|   | 4:51 | RTABORG (426) | Virtualized real address of Radix Table (when $SLBE_{RS}$ = 1 or $VRMASD_{RS}$ = 1) |
|   | 52:54 | Key (428) | KEY bits 2:4 |
|   | 55 | R (430) | Reference bit |
|   | 56 | C (432) | Change bit |
|   | 57:60 | WIMG (434) | Storage control bits |
|   | 61 | N (436) | No-execute page if N = 1 |
|   | 62:63 | PP (438) | Page Protection bits 1:2 |

Further details regarding one implementation of page tables and page table entries are described in Power ISA™ Version 2.06 Revision B specification, Jul. 23, 2010, offered by International Business Machines Corporation and incorporated herein by reference in its entirety.

The use of a hash page table to translate addresses is only one example of a translation technique. Other address translation schemes, including those that use a hierarchy of translation tables, are described below, as well as in the following publications: z/Architecture—Principles of Operation, Publication No. SA22-7932-08, 9th Edition, August 2010, and Intel Itanium Architecture Software Developer's Manual Volume 2: System Architecture, Document Number: 245318-005, each hereby incorporated herein by reference in its entirety. In one example, for the z/Architecture, the hierarchy of tables is referred to as dynamic address translation (DAT) tables; and for Power ISA, the tables are referred to as radix tables.

Figure 5A:
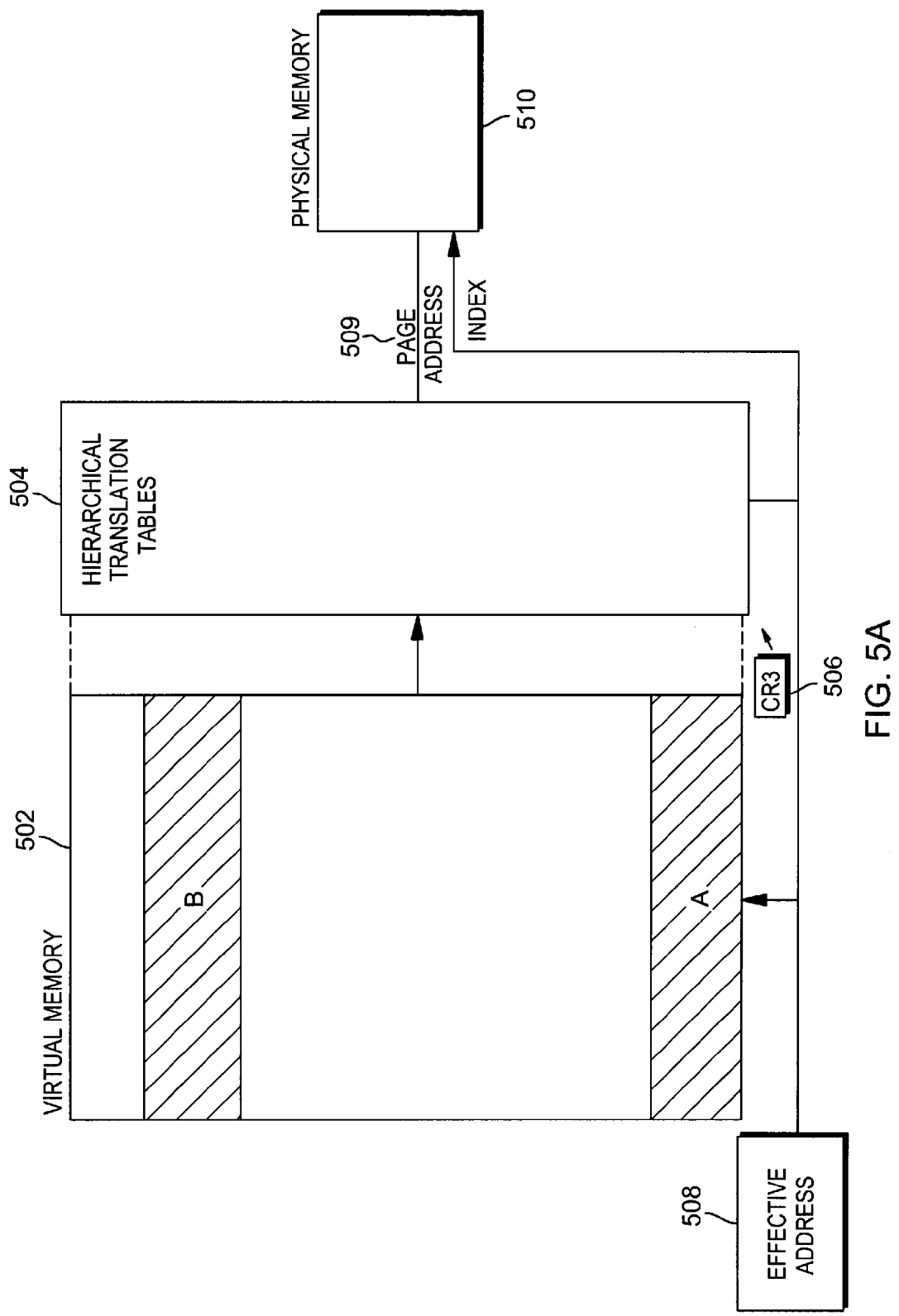
FIG. 5A depicts one example of a hierarchical translation mechanism.

One example of a hierarchical translation table translation mechanism is described with reference to FIG. 5A. In this example, translation tables 504 are provided for translating addresses of virtual memory 502, though only regions A and B are to be used, in this example, to real addresses. The origin of the highest order translation table of the hierarchical translation tables 504, is provided, for example, by a control register (CR3) 506. An effective address 508 is used to index into each table of the hierarchical translation tables 504 to determine an origin address of the next table until, for example, a page table entry (PTE) having an address 509 of a page of physical memory 510 is located. In one example in which the translation mechanism is DAT, the effective address is a virtual address having a plurality of indices used to index into the translation tables.

Figure 5B:
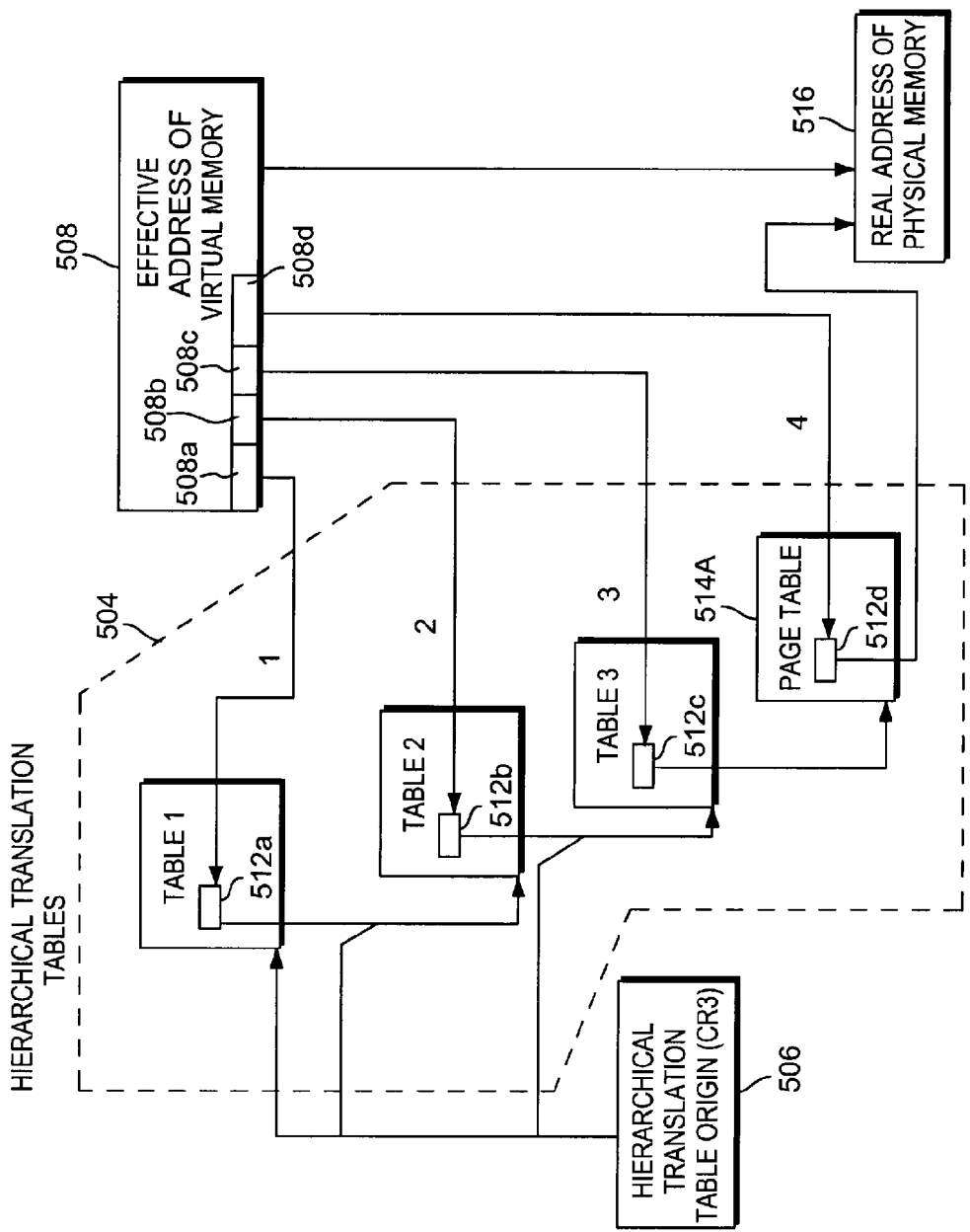
FIG. 5B depicts one example of indexing of high-level translation tables.

FIG. 5B shows one example in which the highest level translation table of the hierarchy is "indexed" by the high portion 508a of an effective address 508 to locate a Table 1 entry 512a that is used to locate the next translation table (Table 2). That is, entry 512a includes an origin address of Table 2. Similarly, a next portion 508b of the effective address 508 is used to index into Table 2 to find a Table 2 entry 512b having the origin address of Table 3. A next portion of the effective address 508c is used to index into Table 3 to find a Table 3 entry 512c having an origin address of a Page Table 514a. A next portion 508d of the effective address 508 is used to index into Page Table 514a to locate a page table entry 512d having the address of a physical memory page 516. The origin of the hierarchy of translation tables, in one embodiment, may include a table selector field for determining which of the hierarchy of translation tables, the origin applies. Thus, the translation may require only a subset of the hierarchy (wherein an effective address is limited to include a predetermined number of most significant bits having a zero value). A translation using fewer tables will be faster than one using more tables.

The page table entry located by traversing the hierarchical page tables includes various information including at least a portion of a real address used to access the physical memory. The format and information included in the page table entry depends on the architecture of the system configuration and/or the specific type of translation.

Figure 6A:
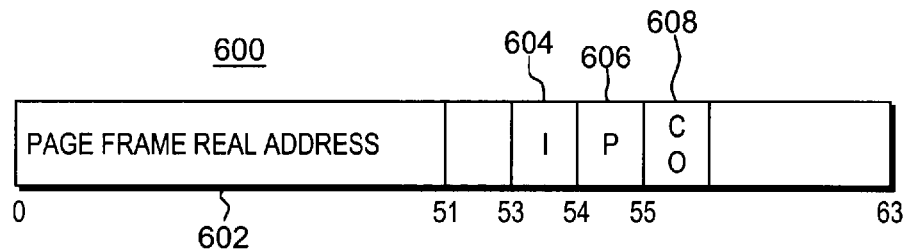
FIG. 6A depicts an example of a page table entry for the z/Architecture.

In one example in which the address translation is the DAT translation of the z/Architecture, a page table entry 600 includes the following, as depicted in FIG. 6A:

Page-Frame Real Address (PFRA) (602): Bits 0-51 provide the leftmost bits of a real storage address. When these bits are concatenated with the 12-bit byte index field of the virtual address on the right, a 64-bit real address is provided;

Page-Invalid bit 604 (I): Bit 53 controls whether the page associated with the page table entry is available. When the bit is zero, address translation proceeds by using the page table entry. When the bit is one, the page table entry is not to be used for translation;

DAT-Protection Bit (P) 606: Bit 54 controls whether store accesses can be made in the page. This protection mechanism is in addition to the key-controlled-protection and low-address-protection mechanisms. The bit has no effect on fetch accesses; and Change-Recording Override (CO) 608: When enhanced DAT does not apply, bit 55 of the page-table entry is to contain zero; otherwise, a translation-specification exception is recognized as part of the execution of an instruction using that entry for address translation. When enhanced DAT applies and a segment table entry (STE) format control is zero, bit 55 of the page-table entry is the change-recording override for the page.

Figure 6B:
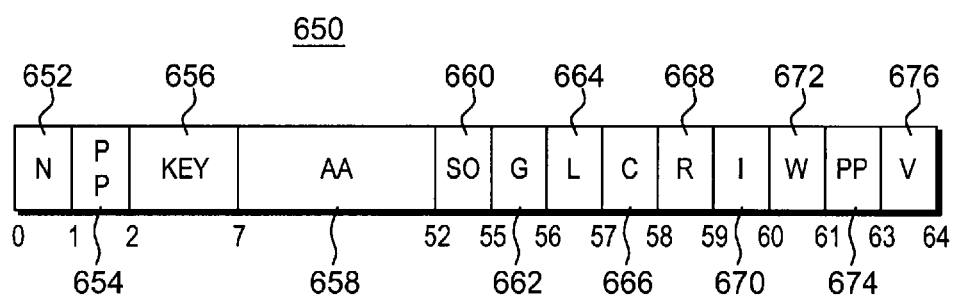
FIG. 6B depicts one example of a page table entry for the Power ISA architecture.

As a further example in which the address translation is the radix translation of Power ISA, a page table entry includes the following fields, as depicted in FIG. 6B. The format of this page table entry includes at least some fields similar to the fields of the page table entry obtained using the hash technique for Power ISA. In one example, page table entry 650 includes:

| Bits | Name | Description |
| --- | --- | --- |
| 0 | N (652) | No-execute page if N = 1 |
| 1 | PP (654) | Page Protections 0 |
| 2-6 | Key (656) | KEY bits 0:4 |
| 7-51 | AA (658) | Abbreviated Address (concatenated with twelve zeros) |
| 52-54 | SO (660) | Available for software |
| 55 | G (662) | Guarded |
| 56 | L (664) | Leaf |
| | | 0-is Page Directory Entry (PDE) (0-1, 52-55, 57-62 ignored) |
| | | 1-is Page Table Entry (PTE) |
| 57 | C (666) | Changed |
| 58 | R (668) | Reference |
| 59 | I (670) | Cache Inhibited |
| 60 | W (672) | Writethrough |
| 61-62 | PP (674) | Page Protections 1:2 |
| 63 | V (676) | Valid Entry Indicator |

In accordance with one aspect, a system configuration is provided with different types of address translation structures for use in translating addresses. As examples, one type uses a hierarchical data structure (e.g., a radix structure), and another type uses a hash data structure. Other and/or different types of structures may also be used, including, for instance, a combination of a hierarchical and a hash structure, or an offset structure, as examples. Further, in one example, the type of translation structure to be used for a particular translation is selectable.

One embodiment of the logic to select from a plurality of translation mechanisms to translate an address is described with reference to FIG. 7A. In this example, the environment is a virtualized environment having one or more guests (e.g., guest operating systems executing within partitions) supported by a host (e.g., a host machine including a host operating system and/or a hypervisor), and the address being translated is a guest virtual address (obtained based on an effective address) to a host physical address (a.k.a., host real address). In one embodiment, hardware of the environment (e.g., the MMU) is used to perform the logic of FIG. 7A, unless otherwise noted. In another embodiment, hardware and/or firmware is used to perform the logic. As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Figure 7A:
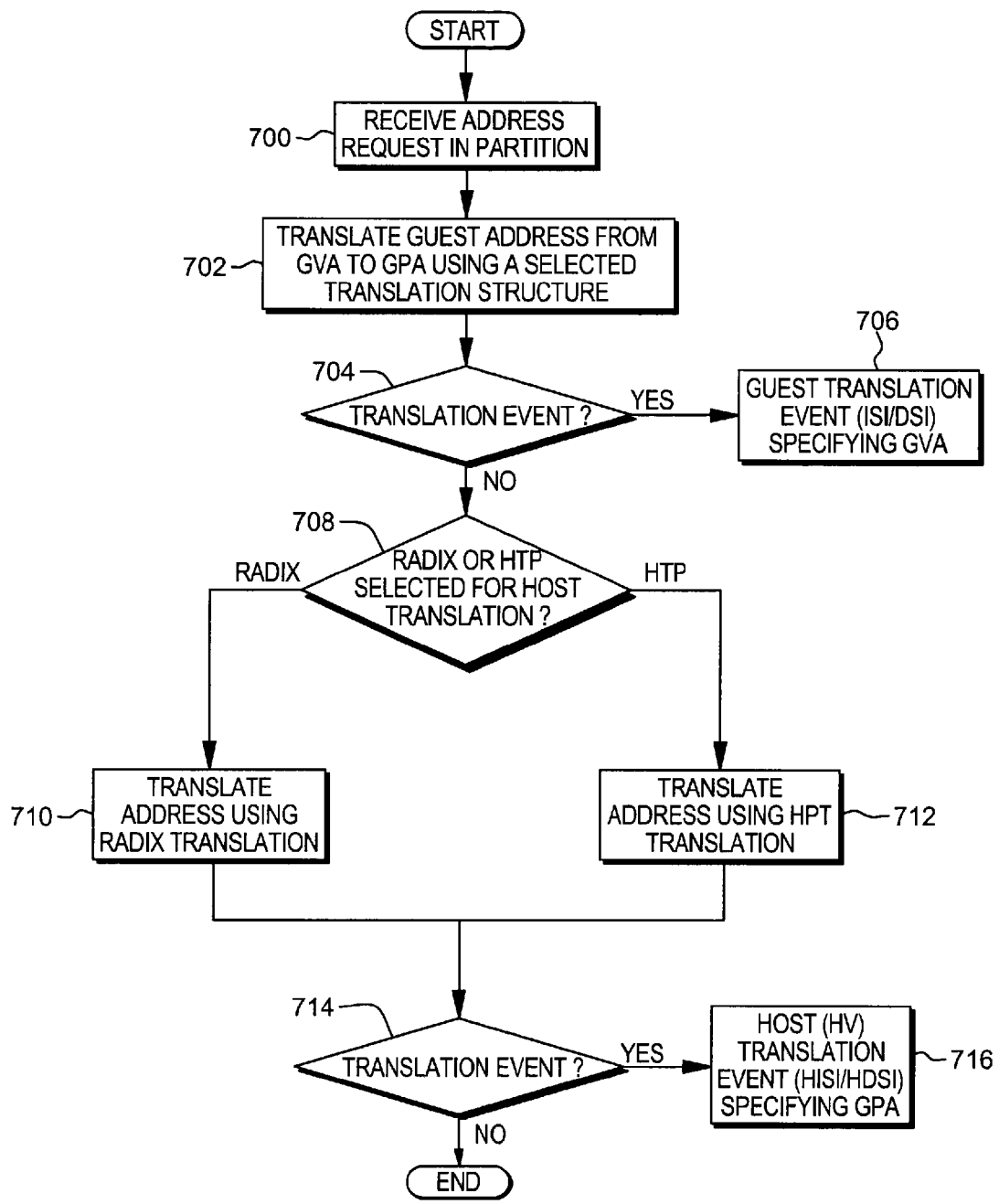
FIG. 7A depicts one example of the logic to select a translation mechanism.

Referring to FIG. 7A, initially, the hardware within a partition (e.g., MMU of a processor within the virtualized environment) receives a memory access request which includes a memory address translation request for an effective address, STEP 700. The memory address request may be a memory operation to load/store, a memory operand in an instruction, an instruction address to be accessed during an instruction fetch, a load real address, or a prefetch instruction, as examples.

Based on the effective address in the translation request, a guest virtual address is obtained and translated within the partition to a guest physical address using a selected translation format, such as, for instance, a radix translation, STEP 702. A determination is made as to whether a translation event has occurred based on the translation from the guest virtual address to the guest physical address, INQUIRY 704. If a translation event has occurred, then that event (e.g., radix table miss), along with the guest virtual address, is presented from the hardware to the operating system using an instruction storage interrupt (ISI) or data storage interrupt (DSI) depending on whether the translation that resulted in a fault corresponded to an instruction or data access, STEP 706. However, if there was no translation event, then the guest virtual address has been translated to the guest physical address.

Next, a determination is made as to the type of translation to be selected to translate the guest physical address to the host physical address, INQUIRY 708. In the example herein, it is either a hierarchical translation mechanism (e.g., radix) or a hash page table translation mechanism that is selected; however, in other embodiments, other types of translation mechanisms may be selected, such as an offset mechanism or other types. In one embodiment, the selection of the translation mechanism is dependent on the type of hypervisor that is configuring the system for translation, and the preference of that hypervisor; and/or the selection may be based on the condition of the memory. For instance, if host memory has little fragmentation or large pages, a radix or other hierarchical translation mechanism may be selected; for heavily fragmented host memory, a hash page table translation mechanism may be selected; and for static partitions, an offset translation mechanism may be selected. Other selection criteria are also possible.

Further, in one embodiment, selection may be performed at various levels of translation including, for instance, from guest virtual to guest physical, and/or from guest physical to host physical, and each selection is independent of the other. That is, the selection of a particular structure at one level (e.g., guest level) has no bearing on the selection at another level (e.g., host level).

The selection, in one example, is configured by the hypervisor for the system by setting one or more indicators in one or more control registers, other registers, or memory, subsequent to making the selection and prior to receiving a translation request. In another example, the selection is made dynamically by, for instance, the hypervisor or operating system, at the time of the translation, and that selection is provided to the hardware or firmware.

Continuing with INQUIRY 708, if a radix (or other hierarchical) translation is selected for the host translation, then the guest physical address is translated to the host physical address using a radix (or other hierarchical) translation, STEP 710. However, if hash page table translation has been selected, then the guest physical address is translated to the host physical address using a hash page table translation, STEP 712. Other translation mechanisms may also be selected, although, not shown in this particular example.

If a translation event occurs during translation of the guest physical address to the host physical address, INQUIRY 714, then that event is indicated to the hypervisor via a host instruction storage interrupt (HISI)/host data storage interrupt (HDSI), in which the guest's physical address is specified, STEP 716. If a translation event has not been indicated, then the guest physical address has been translated to the host physical address, and the host physical address is usable for the memory access.

Figure 7B:
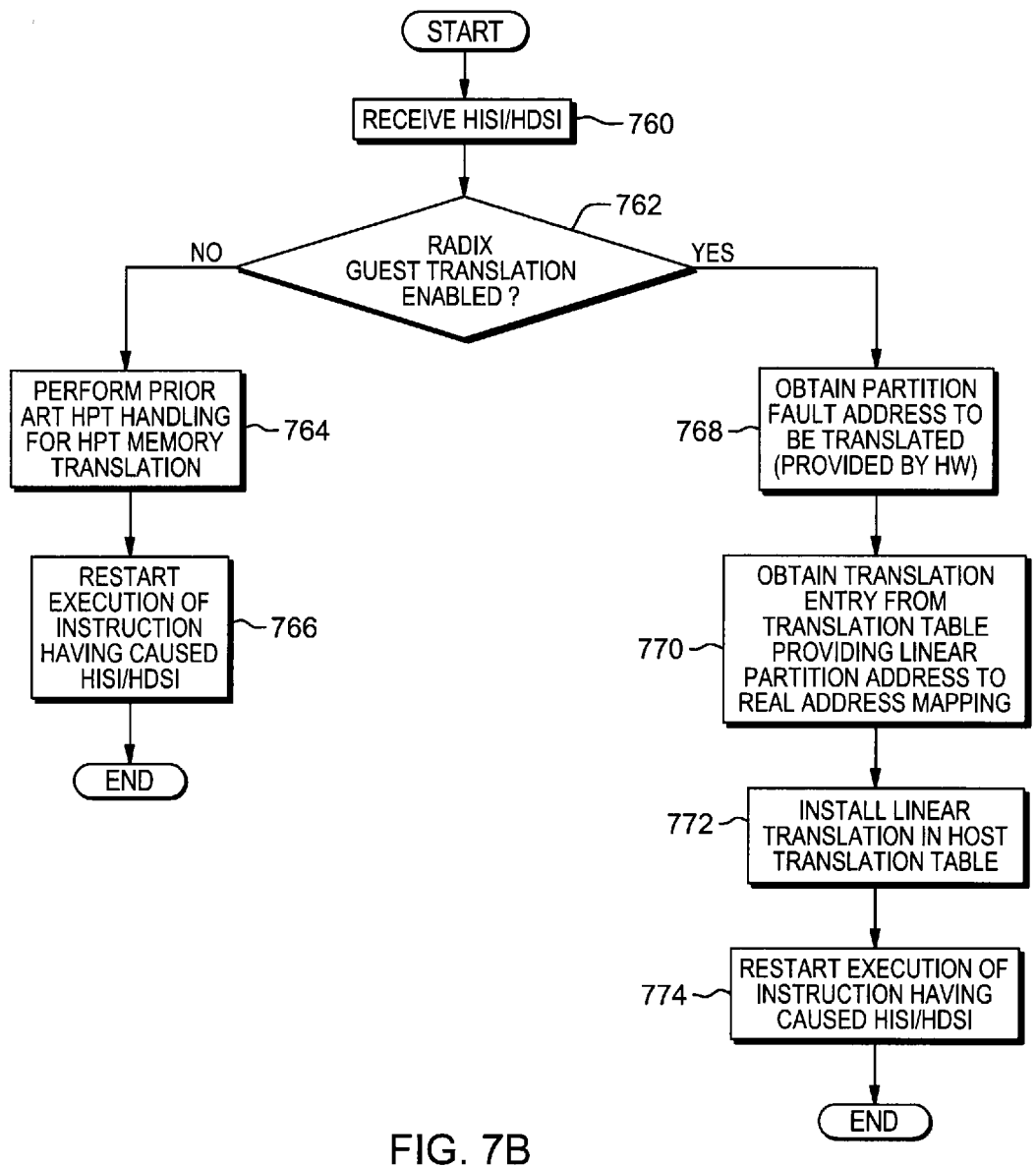
FIG. 7B depicts one embodiment of the logic performed by a hypervisor to handle a fault resulting from address translation.

Should the hypervisor be interrupted via an HISI or HDSI, the hypervisor performs certain processing, an example of which is depicted and described with reference to FIG. 7B. Initially, the hypervisor receives the HISI/HDSI, STEP 760. Thereafter, in one embodiment, a determination is made as to whether radix guest translation is enabled, INQUIRY 762. In one example, this is determined by an indicator in a control register or other register. If radix guest translation is not enabled, then HPT event handling for HPT memory translation is performed as usual, STEP 764. For instance, the hypervisor reloads the HPT. Further, execution of the instruction that caused the HISI/HDSI is restarted, STEP 766.

Returning to INQUIRY 762, if radix guest translation is enabled, in one embodiment, the partition fault address (e.g., the guest physical address) to be translated is obtained by the operating system from the hardware, STEP 768. Further, a translation entry for that address is obtained from a memory map to load the host translation table, STEP 770. The translation entry that is obtained is installed in the host translation table (e.g., HPT or radix, in a further embodiment), STEP 772, and execution of the instruction having caused the HISI/HDSI is restarted, STEP 774.

For example, in one embodiment, host translation is performed using an HPT structure. In accordance with this embodiment, further to STEP 768, a translation entry for that address is obtained from a memory map to load the HPT, STEP 770. In accordance with another embodiment and in another execution, a host physical page has been paged out and is paged in prior to installing a translation entry. The translation entry that is obtained is installed in the HPT, STEP 772, and execution of the instruction having caused the HISI/HDSI is restarted, STEP 774. In another embodiment, host translation is performed by a radix structure. In accordance with this embodiment, further to STEP 768, a translation fault is handled for a radix table, e.g., a translation entry for that address is obtained from a memory map to load the radix table, STEP 770. In accordance with another embodiment and in another execution, a host physical page has been paged out and is paged in prior to installing a translation entry. The translation entry that is obtained is installed in the radix table, STEP 772, and execution of the instruction having caused the HISI/HDSI is restarted, STEP 774.

In one embodiment, multiple partitions of a guest/host system configuration supported by a single central processing unit architecture may be configured to use different address translation formats (e.g., different guest formats). For instance, one guest is configured to use a hierarchical translation format (e.g., radix) for guest translations, while another guest is configured to use a hash translation format for guest translations. Further, the guests may use different host translation formats. For instance, one guest may use a single level of translation, and thus, the same translation format used for the guest translation is used for the host translation. For instance, a hash translation format is used to translate a guest virtual address to a host physical address. Further, another guest may use a nested level of translation, and thus, one format (e.g., radix) may be used to translate the guest virtual address to a guest physical address, and another or the same format (e.g., hash, offset, radix) may be used to translate the guest physical address to a host physical address. In one example, both guests are supported by the same hypervisor.

Figure 8A:
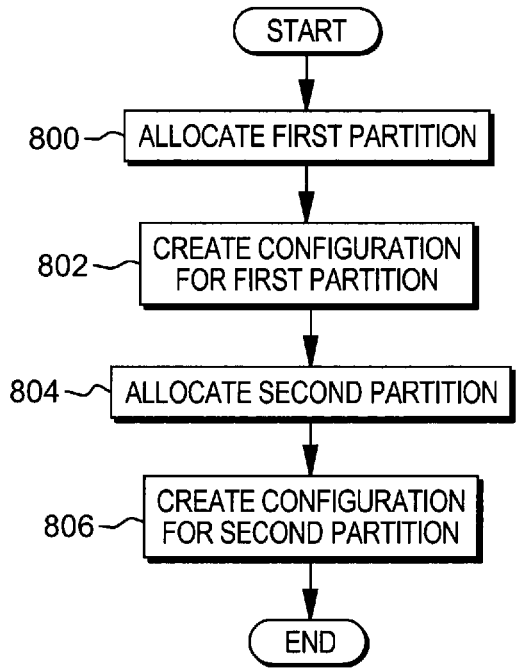
FIG. 8A depicts an embodiment of the logic to initialize partitions.
Figure 8B:
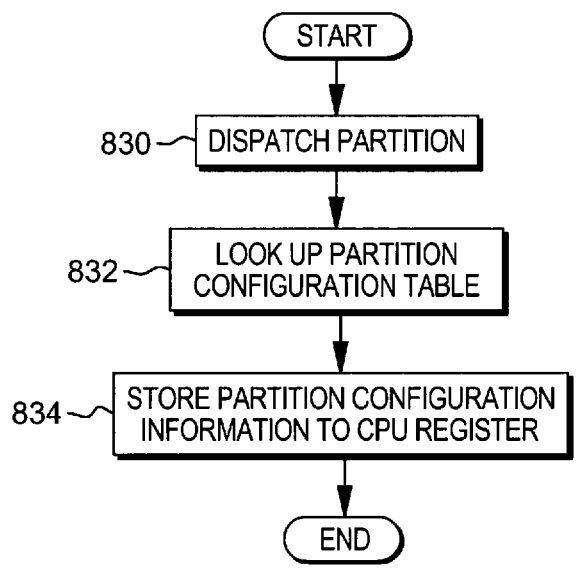
FIG. 8B depicts one embodiment of the logic to dispatch a partition.
Figure 8C:
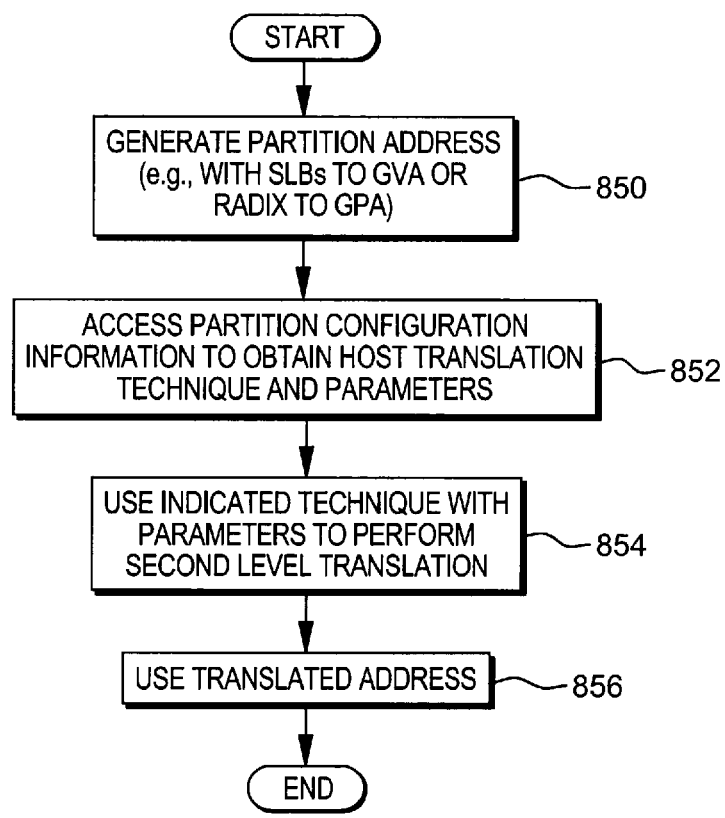
FIG. 8C depicts one embodiment of the logic to translate an address within a configured and dispatched partition.

Further details of one embodiment of configuring partitions for address translation are described with reference to FIGS. 8A-8C. Referring to FIG. 8A, initially, a first partition is allocated by, for instance, the hypervisor, STEP 800. This includes setting aside memory in the central processing unit for the partition, as well as system resources to be used by the operating system and/or applications of the partition. Thereafter, a configuration is created for the first partition, STEP 802, including, for instance, indicating in a configuration table the type of address translation format to be used by the partition for host level translations (e.g., radix, hash, etc.) and/or the type of partition (e.g., single level or nested level translation). This configuration table may also include the translation format to be used for guest level translations. In a further embodiment, a partition includes a plurality of portions and each portion is assigned an address translation mechanism. The address translation mechanism assigned to a portion is selectable and may be the same or different for each portion. These assignments are included in one or more configuration tables.

The above process is repeated for a second partition and any other partitions that are to be allocated. As shown, a second partition is allocated, STEP 804, and a configuration is created for the second partition, STEP 806. Again, other partitions may be allocated and configured.

In a further embodiment, the partition type and/or translation mechanism is selected at partition dispatch time, described below, via a hypervisor call. Further, a hypervisor call may be used to change the type of partition or the selected translation mechanism.

Thereafter, one or more partitions are dispatched as described with reference to FIG. 8B. That is, partitions are provided time-slices in which to execute. Thus, in one embodiment, at a particular time, a selected partition is dispatched, STEP 830. For instance, it is assigned system resources to enable its operating system and applications to run. Further, the partition configuration table is accessed, STEP 832, and the partition's configuration information obtained from the configuration table is stored in, for instance, one or more CPU configuration registers or a memory structure to be used, for instance, in address translations, STEP 834. This processing is performed for each partition to be dispatched.

Subsequent to configuring and dispatching a partition, address translation may be provided for that partition. For instance, as shown in FIG. 8C, in one example, a partition address is generated, STEP 850. For instance, a guest virtual address is generated using an SLB (e.g., in a single level translation mechanism), or a guest physical address is generated from a guest virtual address (e.g, in a nested level translation mechanism) using a guest translation structure (e.g., radix). Then, the partition configuration information is accessed to obtain a host translation technique and parameters to be used to translate the guest address to a host physical address, STEP 852. The generated virtual address is then translated via the indicated technique and retrieved parameters to obtain the host physical address, STEP 854. This address is used to access memory, STEP 856.

In one embodiment, multiple partitions are supported by a single hypervisor, which is able to support paravirtualized partitions, as well as fully virtualized partitions. As used herein, a paravirtualized partition is a partition in which the operating system communicates with the hypervisor to handle address translation faults resulting from host level translation. That is, the guest updates the host's address translation tables; although, some information (such as, for example, the host physical address being used by the system to store a page) may be missing and is to be provided by the hypervisor. In contrast, a fully virtualized partition is one in which the guest operating system is ignorant of the host level translation. The operating system does not receive fault indications and does not manage such faults corresponding to host translation. The term "fully" is used herein simply to distinguish from "paravirtualization". In particular, a system may be fully virtualized with respect to address translation in one partition, but not with respect to other system aspects (such as I/O operations).

The paravirtualized partitions, which use a single level of translation to translate a guest virtual address to a host physical address, and the fully virtualized partitions, which use a nested level of translation in which a guest virtual address is translated to a guest physical address within the partition, and then the guest physical address is translated to a host physical address, are supported, in one embodiment, by the single hypervisor. The hypervisor is of a particular kind, referred to herein as a paravirtualized hypervisor, but also supports full virtualization (e.g., without having to modify the hypervisor, in one embodiment). This is further described below with reference to FIGS. 9A-9B.

Figure 9A:
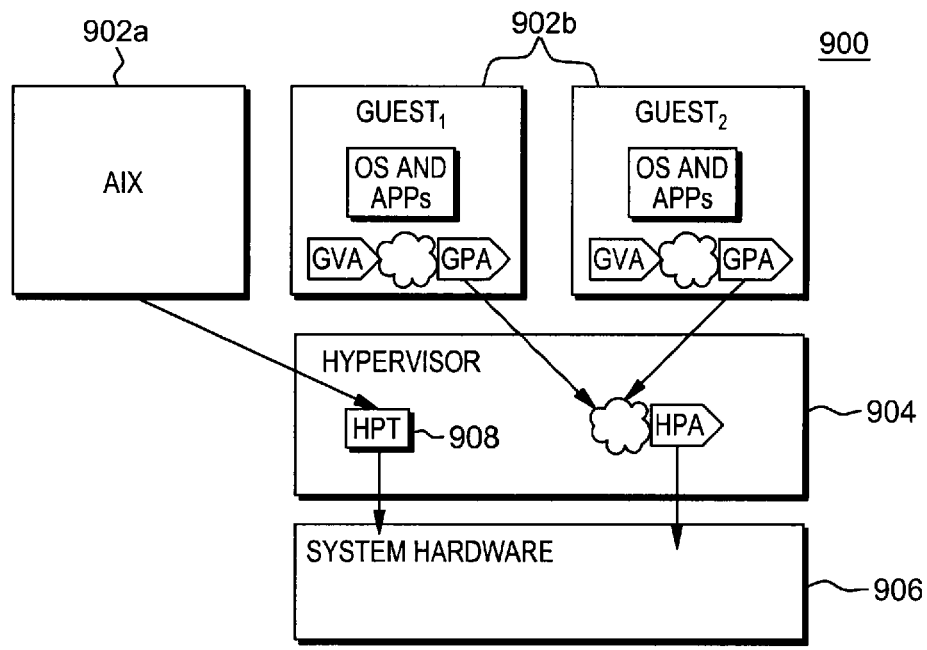
FIG. 9A depicts one example of a hypervisor supporting heterogeneous guests.

Referring initially to FIG. 9A, a system configuration 900 is depicted having heterogeneous guests 902a, 902b supported by a hypervisor 904 running on system hardware 906. In this example, the hypervisor is a paravirtualized hypervisor in which guest 902a, as an example, has the ability to communicate with hypervisor 904 to translate an address from a guest virtual address to a host physical address. That is, the guest manages, at least in part, the address space associated with the address being translated. For instance, if there is an address translation fault (a.k.a., a miss) during host address translation, the operating system (e.g., AIX) is notified (e.g., by the hypervisor, firmware or hardware), and the operating system inserts the missing entry in the host address translation table, although some information will be missing and is to be filled in by the hypervisor. In one example, the address translation table for guest 902a is a hash page table 908.

Additionally, hypervisor 904 also supports guests 902b. However, unlike guest 902a, guests 902b use a multilevel (a.k.a., nested) translation in which a guest virtual address is first translated to a guest physical address within the partition (e.g., using radix translation), and then the guest physical address is translated to the host physical address during host level translation using, for instance, radix translation, hash page table translation, etc. In this scenario, however, the guests are unaware of the hypervisor and do not communicate with the hypervisor. In one aspect of this scenario, the guests are unaware of the hypervisor with respect to host translation operations and do not communicate with the hypervisor with respect to host translations, but may be aware of the hypervisor with respect to other properties (e.g., such as I/O).

Figure 9B:
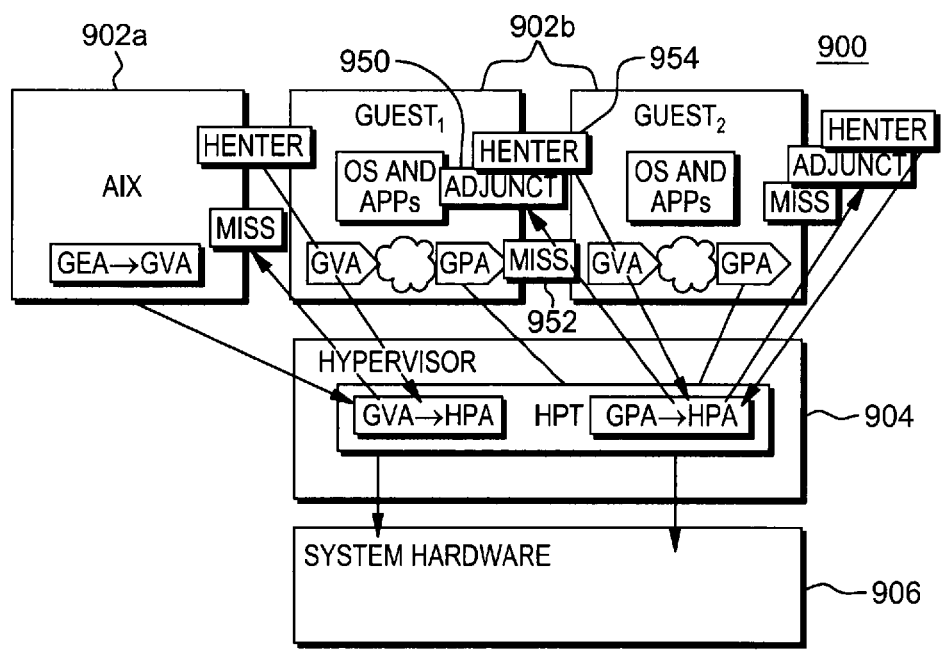
FIG. 9B depicts one embodiment of a hypervisor using an adjunct component to facilitate managing an address translation fault.

Thus, in one embodiment, to enable the hypervisor to also support guests 902b, an adjunct component 950, as shown in FIG. 9B, is used. The adjunct component allows hypervisor 904 to remain as a paravirtualized hypervisor, but support full virtualization as desired by guests 902b. Since guests 902b are ignorant as to the translation provided by the host, but the hypervisor is reliant on another entity, such as the operating system, to handle a miss, should a miss 952 occur in translating the guest physical address to the host physical address, an indication is presented to the partition, but it is the adjunct component that receives the indication and handles the miss (e.g., on behalf of the operating system). In one example, adjunct component 950 uses a system HCALL, HENTER 954, to update the host translation tables. Adjunct component 950 obtains configuration information used to create structures to be used to update the host translation tables.

Figure 10A:
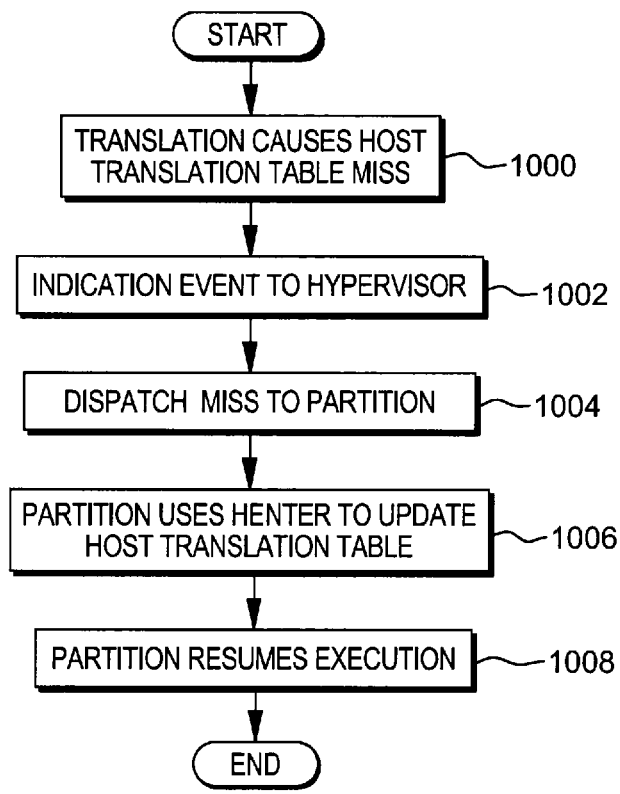
FIG. 10A depicts one embodiment of paravirtualization logic used to manage an address translation fault.
Figure 10B:
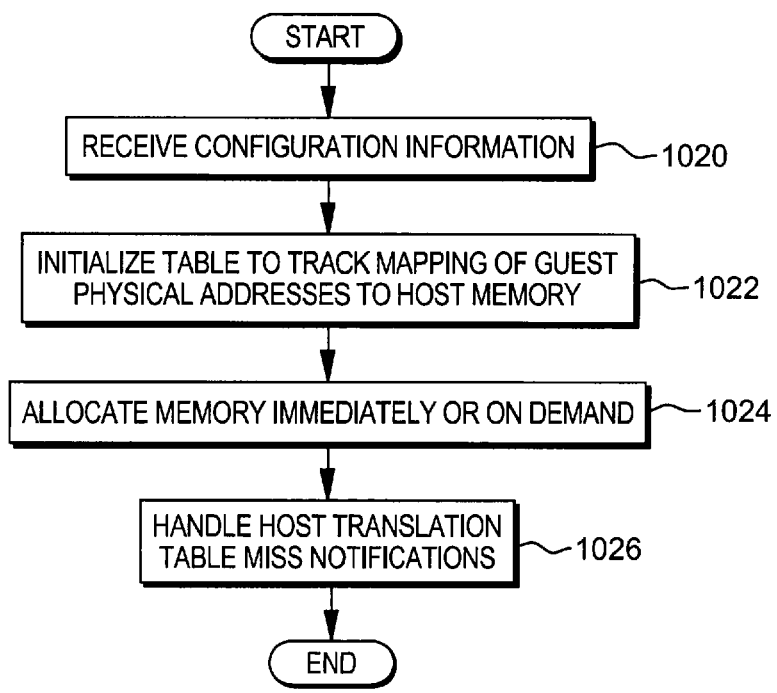
FIG. 10B depicts one embodiment of using an adjunct component to facilitate management of an address translation fault.
Figure 10C:
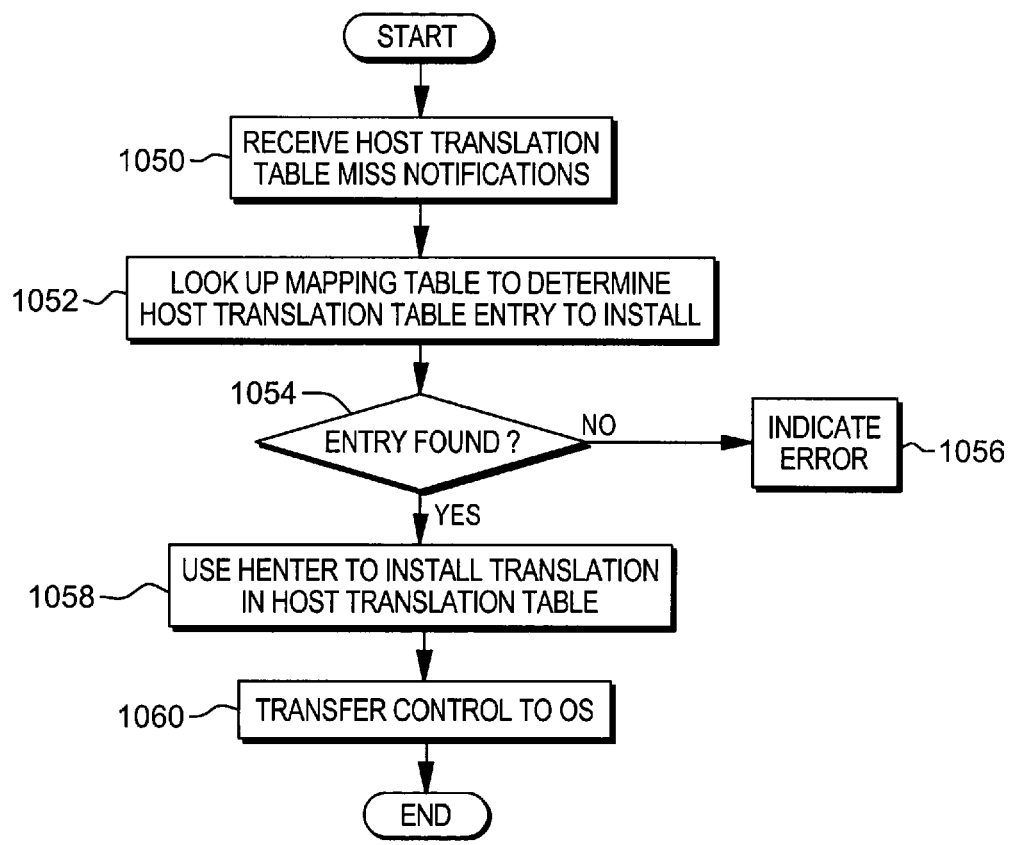
FIG. 10C depicts one embodiment of further details of managing address translation faults.

Further details regarding various mechanisms for handling address translation faults are described with reference to FIG. 10A-10C. Referring initially to FIG. 10A, one embodiment of the logic to manage an address translation fault using a paravirtualized hypervisor is described. In one embodiment, with a partition paravirtualization interface, the location in the host translation table and protection attributes are determined by the guest. These attributes include, for instance, guest virtual address, segment size, page size, $K_s$, $K_p$, pp, Key, etc. Translations are installed into, for instance, the HPT with an HCALL interface. HENTER enters a guest virtual address to host physical address translation, and HREMOVE removes such a translation.

Referring to FIG. 10A, initially, a translation from a guest virtual address to a host physical address causes a miss in a host translation table, such as a HPT, STEP 1000. An indication event is provided from the hardware or firmware to the hypervisor via, for instance, a hypervisor instruction storage interrupt (HISI)/hypervisor data storage interrupt (HDSI), STEP 1002. In one embodiment, the hypervisor dispatches the miss to the partition (e.g., guest operating system), STEP 1004, and the partition updates the translation structure, such as HPT, using, for instance, an HCALL, referred to as HENTER, STEP 1006. Thereafter, the execution of the instruction is resumed and processing is complete, STEP 1008. In one embodiment, the indication event is directly delivered to the partition, without intervention of the hypervisor, combining STEPs 1002 and 1004 into a single step, optionally implemented in hardware. In one aspect of an indication event to a partition, the indication event is an ISI or DSI exception.

One embodiment of the logic of using a full virtualization adjunct component to handle a miss is described with reference to FIG. 10B. Initially, the adjunct component receives configuration information, such as the size of memory and the addresses to be associated with that memory, STEP 1020. The adjunct component initializes a table to track mapping of the guest physical addresses to the host memory, STEP 1022. Additionally, the adjunct component allocates memory either immediately or on demand, STEP 1024. Then, should the adjunct component receive a miss notification for a host translation table, it handles that miss notification, STEP 1026.

Further details regarding handling the miss notification are described with reference to FIG. 10C. Initially, the adjunct component receives the miss notification, STEP 1050. For instance, the exception logic of the system configuration receives an HISI/HDSI and directs the exception to the adjunct component (instead of the operating system). The adjunct component looks up the mapping table to determine the entry to install in the host translation structure, STEP 1052. If the entry is not found, INQUIRY 1054, then an error is indicated, STEP 1056. Otherwise, HENTER is used to install the translation in the host translation structure, STEP 1058. Control is then transferred to the operating system to resume processing of the instruction, STEP 1060.

Figure 11:
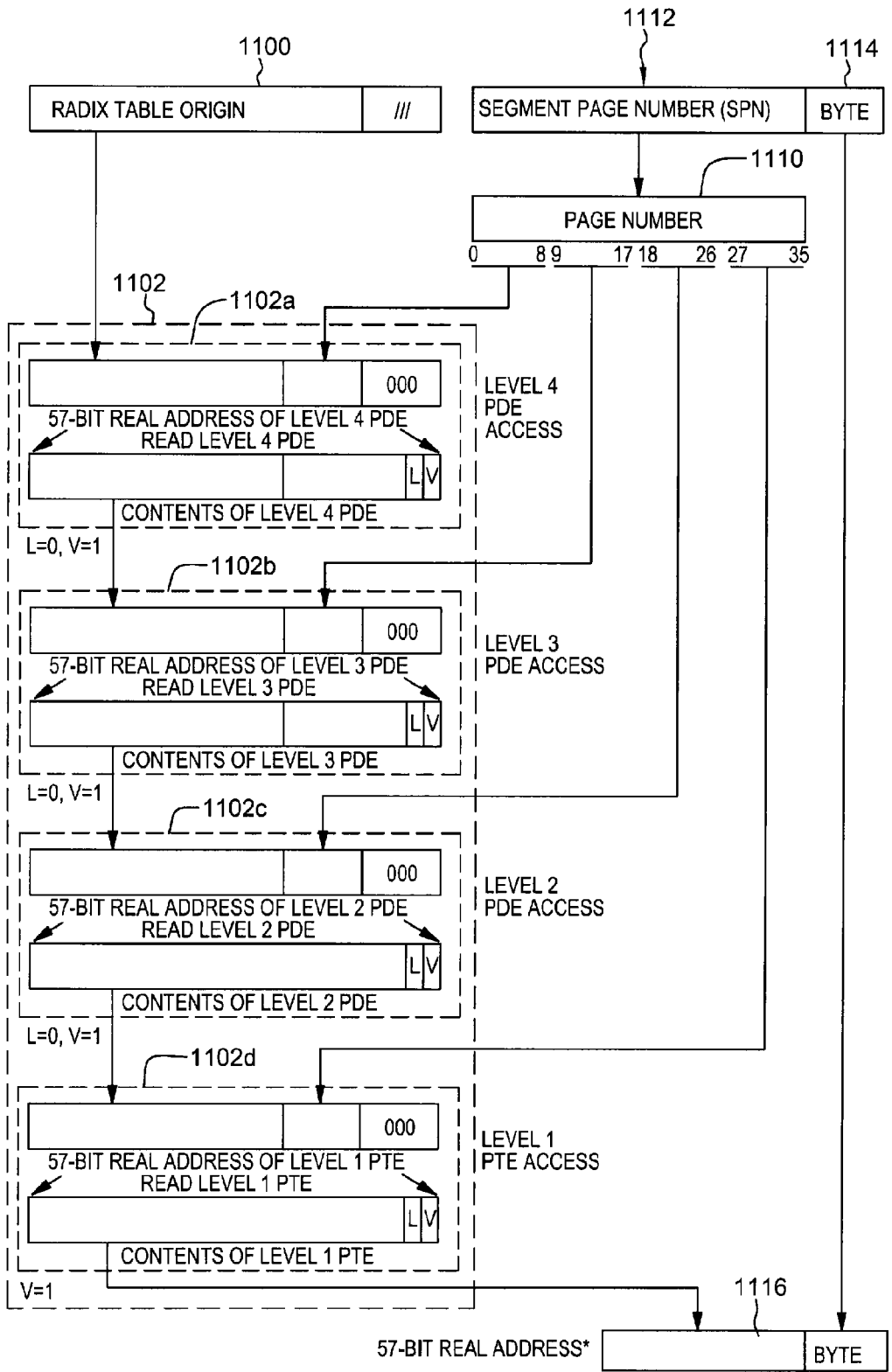
FIG. 11 depicts one embodiment of a radix translation mechanism.
Figure 12:
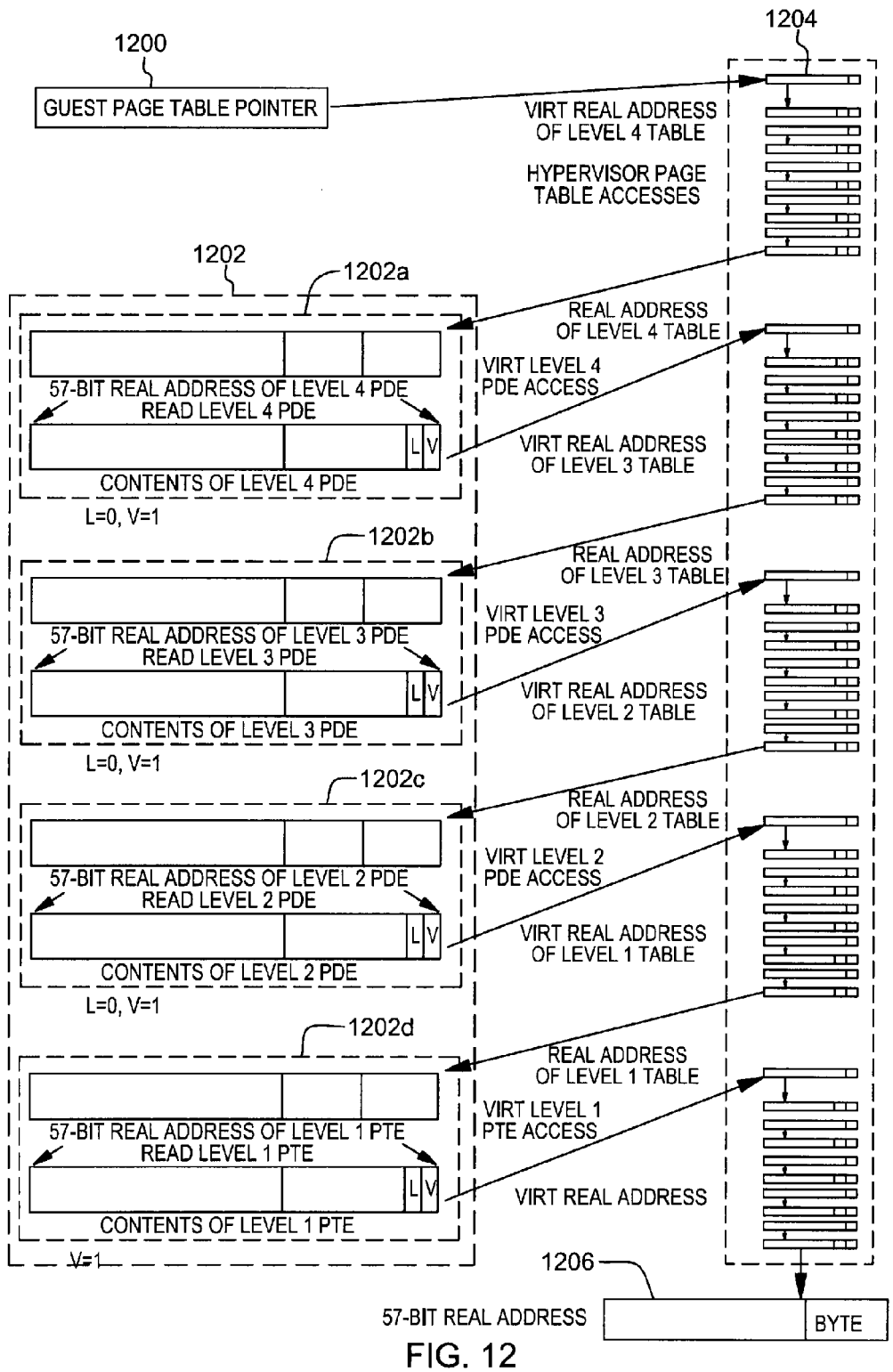
FIG. 12 depicts one example of a radix on radix translation mechanism.
Figure 13:
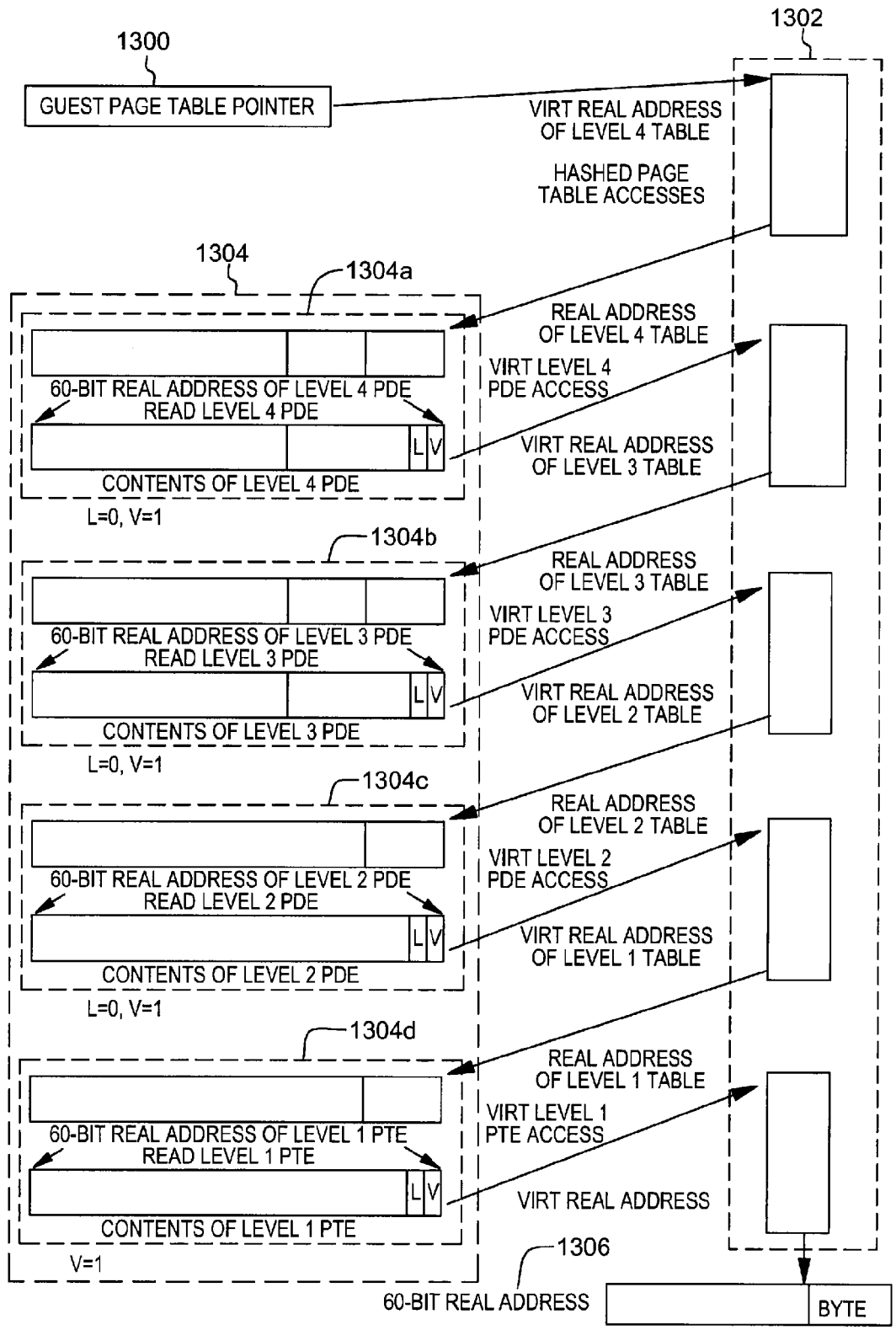
FIG. 13 depicts one example of a radix on hash page table translation mechanism.

Further details regarding different types of translation structures, including a hierarchical translation structure, such as a radix translation structure, and variations thereof, such as a radix on radix translation structure (i.e., using a radix table for guest translation in conjunction with a radix table for host translation), and a radix on hash page table (HPT) translation structure (i.e., using a radix table for guest translation in conjunction with an HPT table for host translation) are described below with reference to FIGS. 11-13.

Referring initially to FIG. 11, one embodiment of the logic to translate a virtual address to a physical address using radix translation is described. As shown, a radix table origin stored in, for instance, a register 1100 indicates the beginning of a radix translation structure 1102. Radix translation structure 1102, also referred to as a radix page table (RTAB), is for instance, a hierarchical, variable sized data structure that specifies the mapping between virtual page numbers and real page numbers, virtual page numbers and virtualized real page numbers, or virtualized real page numbers and real page numbers, where the real page number of a real page is, for instance, bits 0-44 of the address of the first byte of the real page. The RTAB is located in storage having the storage control attributes that are used for implicit access to it. The starting address is aligned in one example to a 4K boundary. The RTAB includes a series of 512-entry tables, in one embodiment.

In one example, radix translation structure 1102 includes, for instance, a plurality of radix structures, including a level 4 page directory (PD) 1102a, a level 3 page directory 1102b, a level 2 page directory 1102c, and a level 1 page table (PT) 1102d. Each page directory and page table includes a plurality of entries, referred to herein as page directory entries (PDEs) and page table entries (PTEs), respectively. (The L field of an entry indicates whether there are additional entries to be used in the translation.) The structures are indexed into, in this example, using a page number 1110 generated from a segment offset 1112 of the effective address.

To index into radix structure 1102, as one example, the first X (e.g., 9) bits of page number 1110 are used as an offset into PD 1102a pointed to by radix table origin 1100. The contents of PD 1102a provides an address of PD 1102b, and the next X bits of page number 1110 are used to index into PD 1102b to obtain an address of PD 1102c. Further, the next X bits of page number 1110 are used to access PD 1102c to obtain the address of the page table 1102d. The next X bits of page number 1110 are used to access the selected PTE of PT 1102d. The output of PTE 1102d combined with byte portion 1114 of segment offset 1112 creates a physical address 1116, also known as a real address.

The above describes one embodiment of translating a virtual address to a physical address using radix translation. However, in the situation in which the virtual address is a guest virtual address, additional processing may be used to translate each guest address to a corresponding host address. One embodiment of this logic is described with reference to FIG. 12, which shows an example of a radix on radix translation mechanism. That is, radix is used for the guest translations, as well as the host translations.

Referring to FIG. 12, a radix on radix translation mechanism includes a radix guest structure 1202 and a radix host structure 1204. Radix translation structure 1202 is similar to radix structure 1102 of FIG. 11 and includes a plurality of radix structures, including a level 4 PD 1202a, a level 3 PD 1202b, a level 2 PD 1202c, and a level 1 PT 1202d, each including a plurality of entries. Similarly, radix host structure 1204, which is repeatedly shown for clarity, also includes a plurality of radix structures including a level 4 PD, a level 3 PD, a level 2 PD and a level 1 PT. A guest page table pointer 1200 (also referred to as a virtual real address of a guest level 4 table) is translated by radix host structure 1204 to provide a real address of the guest level 4 table of radix guest translation structure 1202. For instance, the bits of the virtual real address of the level 4 table are used to walk host radix structure 1204, as described above with reference to FIG. 11, to obtain a real address of level 4 PD 1202a. As an example, the first X (e.g., 9) bits of virtual real address 1200 are used to index into a level 4 PD of structure 1204 to obtain from its selected entry an address of a level 3 PD of structure 1204. The next X bits of virtual real address 1200 are used to index into the level 3 PD of structure 1204 to obtain an address of the level 2 PD of structure 1204. The next X bits of address 1200 are used to index into the level 2 PD of structure 1204 to obtain an address of the level 1 PT of structure 1204, and the next X bits of address 1200 are used to index into the level 1 PT of structure 1204 to obtain a real address of level 4 PD 1202a.

Then, in guest structure 1202, the first X (e.g., 9) bits of the effective address (not shown) to be translated are used to index into the level 4 PD 1202a to obtain a virtual real address of level 3 PD 1202b. This virtual address is translated into a real address of level 3 PD 1202b using radix host structure 1204, which is indexed into using the bits of the virtual real address of the level 3 PD, as described above. The second set of X bits of the effective address is then used to index into PD 1202b to obtain a virtual real address of level 2 PD 1202c. That address is then translated using host structure 1204 to obtain a real address of level 2 PD 1202c. The third set of X bits of the effective address is used to index into PD 1202c to obtain a virtual real address of PT 1202d. The virtual real address is then translated using radix host structure 1204 to obtain a real address of level 1 PT 1202d. The next X bits of the effective address are used to index into PT 1202d to obtain a virtual real address. The virtual real address is translated using radix host structure 1204, and the output of that translation combined with a byte offset of the effective address is a host physical address 1206. In one example, using this type of translation, it takes 24 reads to translate an address, in the worst case.

In addition to the above, a radix on hash page table (HPT) translation mechanism is provided, in which the guest translations are via a radix structure and the host translations are via a hash page table structure. An example of a radix on hash page table translation is described with reference to FIG. 13. Referring to FIG. 13, a guest page table pointer 1300 (also referred to as a virtual real address of level 4 table (1304a)) is input to a host hash page table 1302 to translate address 1300 to a real address of level 4 PD 1304a of a guest radix translation structure 1304. Similar to the radix structures described above, radix translation structure 1304 includes a plurality of radix translation structures, including, for instance, a level 4 PD 1304a, a level 3 PD 1304b, a level 2 PD 1304c, and a level 1 PT 1304d, and in this case, the real address of level 4 structure 1304a, referred to as a level 4 page directory (PD), is obtained from HPT 1302.

The first X (e.g., 9) bits of the effective address to be translated are used to index into PD 1304a to obtain the pertinent contents. As in each of these translations, the contents of the selected level 4 page directory entry of PD 1304a are checked to see if there are additional levels to be searched (e.g., is L=0), and if so, the virtual real address of PD 1304b is used to hash into HPT 1302. Based thereon, the real address of a level 3 PD structure 1304b is obtained. The next X bits of the effective address are used to index into PD 1304b and this access provides a virtual real address of a level 2 structure 1304c. This virtual address is used in hash structure 1302 to obtain a real address of structure 1304c. The next X bits of the effective address are used to index into PD 1304c to obtain a virtual real address of level 1 PT 1304d, which is used to access the HPT. The output of the HPT access is the real address of a level 1 table 1304d, which is used to obtain another virtual real address. Since implicitly L=1 as all levels in the page table have been exhausted, this is the last table of the radix structure, and therefore, this entry is the page table entry. The next X bits of the effective address are used to index into the page table to provide the guest physical address. The guest physical address is used to access the hash table. The output of the hash table combined with a byte offset of the effective address provides the host physical address 1306 corresponding to the effective address being translated.

Figure 14A:
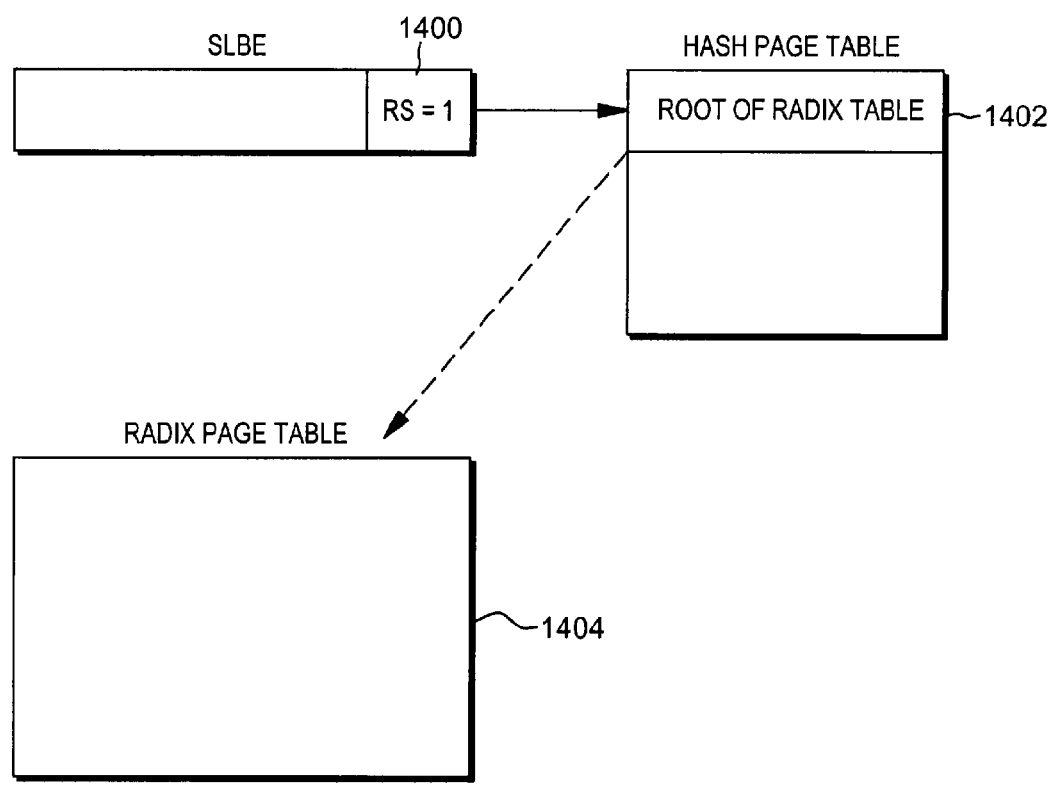
FIG. 14A depicts one example of using a translation structure of one type to point to a translation structure of another type to perform address translation.

In one embodiment, the guest page table pointer (e.g., guest page table pointer 1300; a.k.a., the virtual real address of the first table in the hierarchy of tables) is obtained using the hash table. That is, the hash table, in this example, is used as an indirect pointer to the radix structure. This is described with reference to FIG. 14A. As shown, in this example, if SLBE$_{RS}$=1 (1400), a PTE (1402) found during a hash PTE search is an indirect PTE used to point to a hierarchical page table 1404 that can be manipulated by non-hypervisor code. In this example, the hierarchical page table is a radix page table (RTAB) to be used by, for instance, the Power ISA architecture, along with the hash table. The ARPN and LP fields of the hash page table entry (located during a hash translation) are replaced by the RTABORG, which is the virtualized real address of the radix page table. That virtual real address is then input into the host translation structure (e.g., HPT) to obtain the real address of the radix translation structure. The radix translation structure (e.g., page table) is used, in one example, to obtain a virtual real address (a.k.a., guest physical address) of physical memory to be accessed. The virtual real address is then converted, in one embodiment, to a host physical address via, for instance, a hash mechanism (see, e.g., FIG. 13) or a radix mechanism (see, e.g., FIG. 12).

One embodiment of the logic associated with translating a memory address using a translation technique that includes multiple types of translation structures is described with reference to FIG. 14B. In this example, the environment is a virtualized environment having one or more guests supported by a host, and the address being translated is a guest virtual address (obtained based on an effective address) to a host physical address (a.k.a., host real address). Since this is a guest/host environment, additional translation is performed to obtain the real address, as described herein.

Figure 14B:
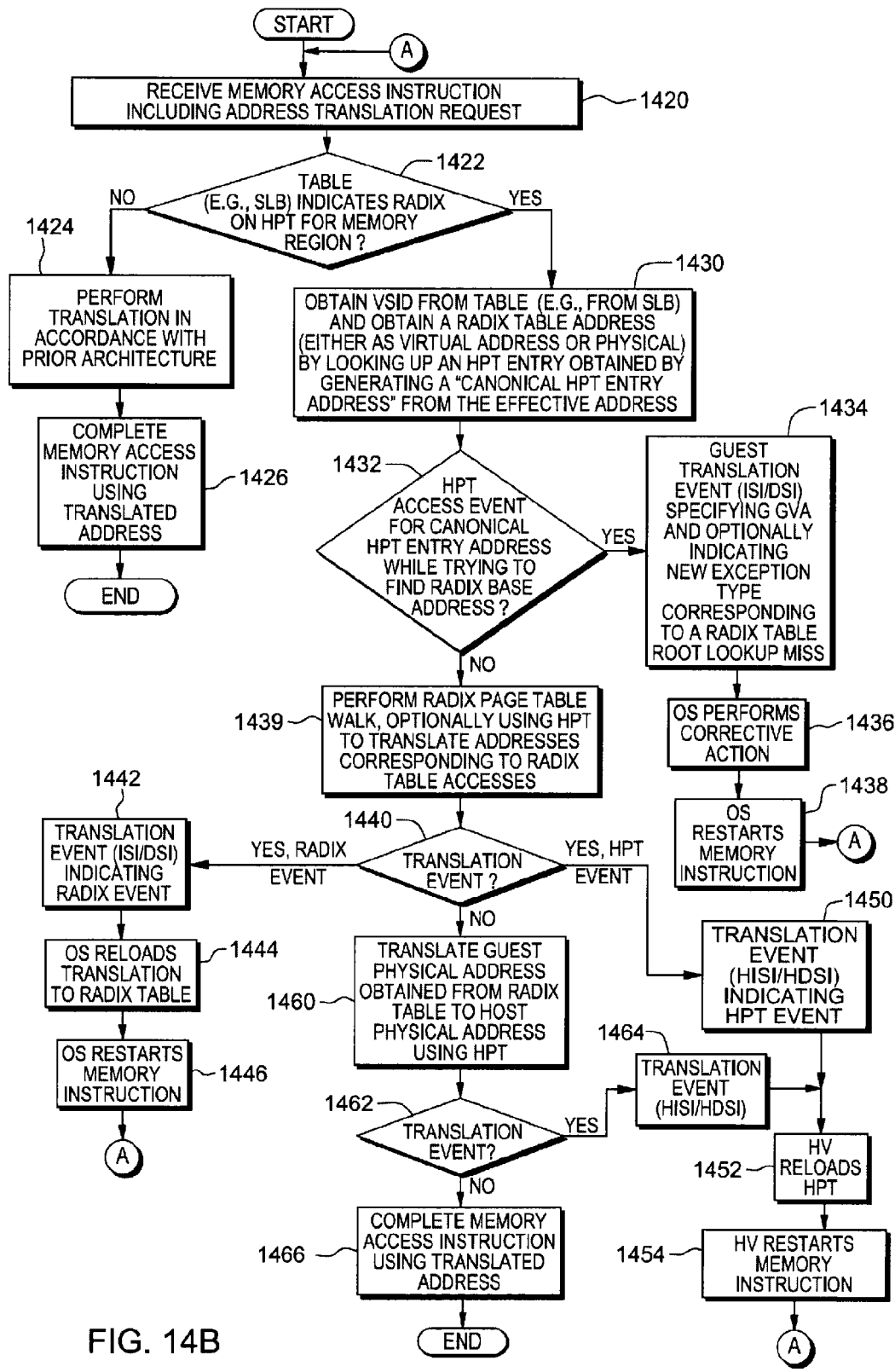
FIG. 14B depicts one embodiment of the logic to translate an address using multiple types of translation mechanisms.

Referring to FIG. 14B, initially, the hardware within a partition (e.g., MMU of a processor of the virtualized environment) receives a memory access request which includes a memory address translation request for an effective address, STEP 1420. The memory address request may be a memory operation to load/store, a memory operand in an instruction, an instruction address to be accessed during instruction fetch, a load real address, or a prefetch instruction, as examples.

A determination is made as to whether multiple types of translation data structures are to be used to translate the effective address of the request to a real address, INQUIRY 1422. For instance, in this particular example, the SLBE associated with the address to be translated (found using the ESID in the request) is checked to determine if the RS indicator of the SLBE is set to one. Since, in this example, the configuration is a guest/host configuration, the logical identifier of the guest partition is used to find the appropriate SLB, and the ESID is used to locate the correct SLBE. If the RS indicator in the SLBE is not set to one, then translation is performed in accordance with prior architecture translation schemes, STEP 1424. For instance, a conventional hash page table translation is used to translate the virtual address to a physical address, as described below. Thereafter, the memory access instruction is completed using the translated address, STEP 1426.

Returning to INQUIRY 1422, if the indicator specifies that multiple types of translation formats are to be used to translate the effective address of the request to a real address, then processing continues with obtaining the VSID from the SLBE, STEP 1430. The VSID is used to locate an entry in one type of table (e.g., the hash table) in order to obtain the root of another type of table (e.g., a hierarchical table, such as a radix table). In particular, in one example, the VSID is used to create a canonical address used to index into the HPT to obtain the RTABORG. A canonical address is an address created for a plurality of pages in a segment. That is, a particular segment includes a plurality of pages that share the same radix table. Therefore, the address used to index into HPT is to be the same for all those pages. In order to create the canonical address, the low order address bits for all the addresses that share the same radix table are zeroed out (and in one embodiment an appropriate constant is added). For instance, the virtual address obtained based on the effective address includes the VSID, and page and byte offsets. The VSID is used (optionally, along with the constant) to create the canonical address. The canonical address is used to index into the HPT to obtain the origin (i.e., the virtual real address of the first table in the hierarchy of tables) of the particular radix table to be used in translation.

A determination is made as to whether an HPT access event occurred for the canonical HPT entry address while trying to find the radix base address, INQUIRY 1432. For instance, was there a miss in the HPT table in that the canonical address could not be located? If so, then a guest translation event is provided specifying the guest virtual address to be translated, STEP 1434. For instance, an instruction storage interrupt (ISI) or data storage interrupt (DSI) depending on whether the translation that resulted in a fault corresponded to an instruction or data access is provided from the hardware to the operating system; i.e., the guest operating system. Optionally, a new exception type corresponding to a radix table root look-up miss is indicated. Thereafter, the operating system performs corrective action, including, for instance, reloading the radix base in the HPT using a hypervisor call, STEP 1436. For instance, the hypervisor is called to load the missing information into the HPT. Additionally, the operating system restarts the memory instruction, STEP 1438, and processing continues with STEP 1420.

Returning to INQUIRY 1432, if there was not an HPT access event for the canonical address, then translation continues with performing a walk of the radix table to obtain the guest physical address from the guest virtual address, STEP 1439. The walk of the radix table uses the page and byte offsets of the effective address similar to the processing described with reference to FIG. 5B. Further, in one example, the translation from guest virtual address to guest physical address also includes using the HPT. That is, since the radix table is stored in a partition (i.e., a guest), it has addresses that correspond to addresses within a partition that are to be translated to real addresses. So, as the radix table is accessed, the HPT is used to translate those accesses to real addresses, as described herein.

Continuing with STEP 1439, should a translation event occur based on a translation performed in STEP 1439, then the event is handled. If it is a radix event, INQUIRY 1440, then such event is indicated by using an ISI/DSI to provide an indication of the event (e.g., radix table miss) to the operating system, STEP 1442. Further, the operating system reloads the translation to the radix table, STEP 1444, and restarts the memory instruction, STEP 1446. Processing continues at STEP 1420.

Returning to INQUIRY 1440, if an HPT event occurred, then a translation event is indicated via, for instance, a HISI/HDSI (hypervisor ISI/DSI) indicating the event, STEP 1450. Further, the hypervisor reloads the HPT, STEP 1452, and the hypervisor restarts the memory instruction, STEP 1454. Processing returns to STEP 1420.

Returning to INQUIRY 1440, if there is not a translation event, then the guest physical address obtained from translating the radix table is translated to a host physical address using, for instance, HPT, STEP 1460. Again, if there is a translation event, INQUIRY 1462, then processing continues with indicating the translation event at STEP 1464. Otherwise, the memory access instruction is completed using the translated address, STEP 1466.

Although, in the above example, a hash table is used to obtain the origin of a radix table, and the hash table and the radix table are used to translate the address, in other embodiments, other types of structures may be used to obtain the origin and/or to perform the translation.

Figure 15:
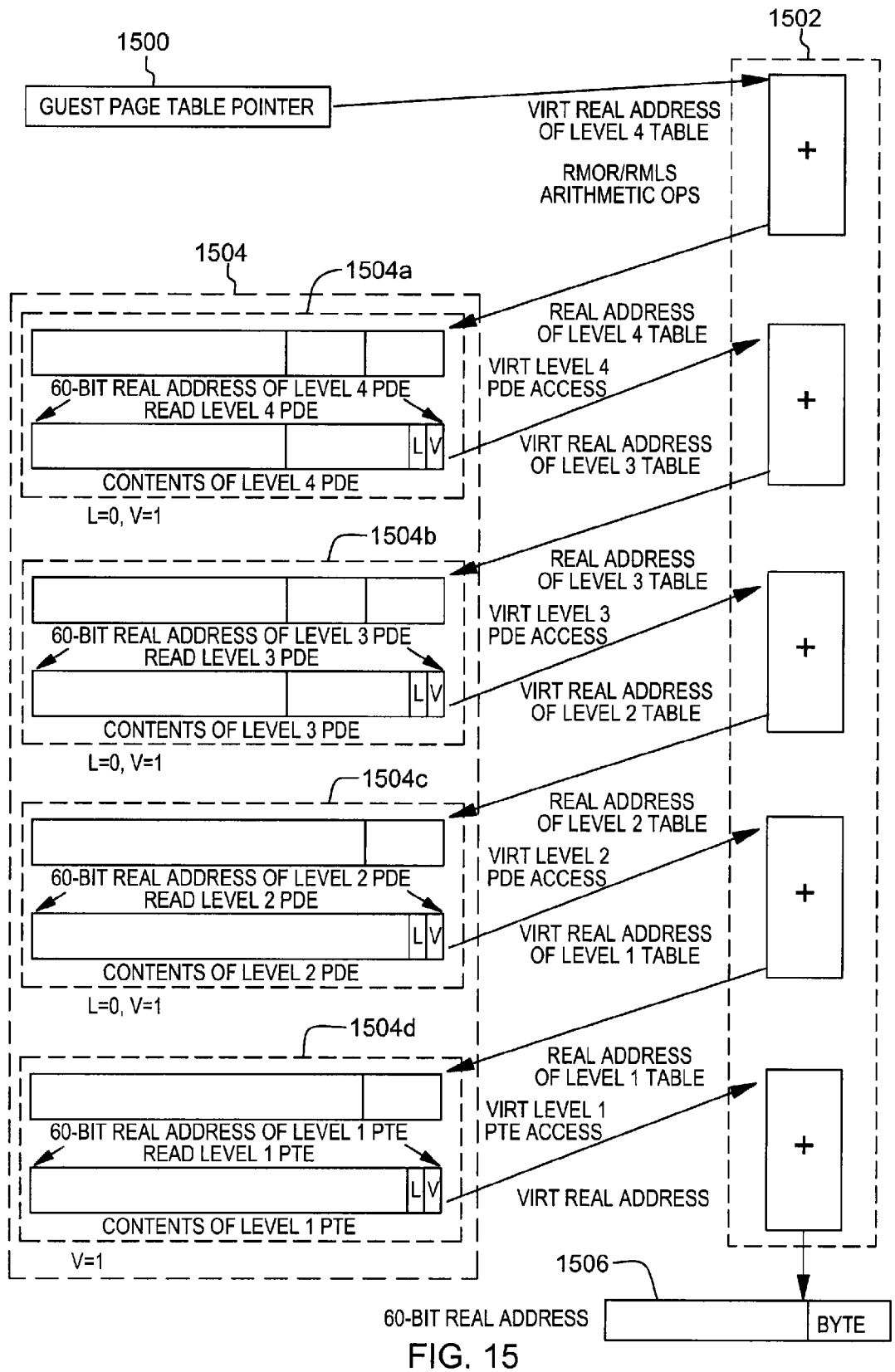
FIG. 15 depicts one embodiment of a radix on offset translation mechanism.

In addition to, or in lieu of, the translation mechanisms described above, other translation mechanisms may be used. One example of another type of translation mechanism is a radix on offset mechanism, in which a radix guest translation mechanism is used in conjunction with a host translation based on a real mode base and a real mode limit, an example of which is described with reference to FIG. 15.

In this example, translation is performed using a real mode offset register (RMOR) and a real mode limit selector (RMLS) 1502 and a radix structure 1504. As described previously, radix structure 1504 includes, in this example, a level 4 PD 1504*a*, a level 3 PD 1504*b*, a level 2 PD 1504*c* and a level 1 PT 1504*d*, each including a plurality of PDEs or PTEs. A guest page table pointer 1500 (a.k.a., a virtual real address of PD 1504*a*) is translated to a real address of PD 1504*a* using a real mode offset register (RMOR) value and a real mode limit selector (RMLS). The RMOR is added to address 1500 and the result of the addition is compared to RMLS. If it is less than the limit, in this example, then the result is used to access PD 1504*a* of radix table 1504. The radix table is walked, as described herein (e.g., using first X (e.g., 9) bits of the effective address), to obtain from the selected PDE of PD 1504*a* a virtual real address of PD 1504*b*. The base and limit are used again, but this time with the virtual real address of PD 1504*b* to obtain the real address of PD 1504*b*. Translation continues and when the selected PTE of PT 1504*d* is located, a guest physical address is obtained which is translated using host structure 1502 to obtain an address that when concatenated with a byte offset of the effective address provides a host physical address to be used in translation.

In one embodiment, in which a guest/host configuration is provided, the particular one or more translation structure formats to be used in translating addresses of a given partition are selectable. In one example, the configuration includes a monitor (e.g., hypervisor, logic partition monitor, virtual machine monitor, etc.) that has the ability to select different translation structure formats for different partitions, as well as different translation structure formats for different memory regions of a single partition. One example of this scenario is depicted in FIG. 16A.

Figure 16A:
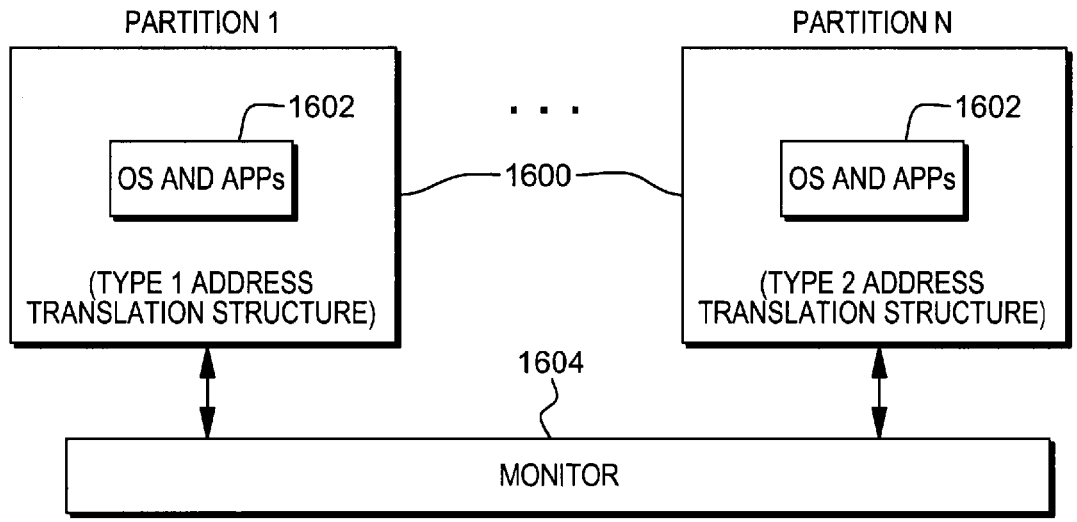
FIG. 16A depicts one example of multiple translation mechanisms for multiple partitions.

As shown in FIG. 16A, a system configuration includes a plurality of partitions 1600. Each partition 1600 includes, for instance, an operating system and one or more applications 1602. Partitions 1600 are supported by a monitor program 1604. As examples, monitor program 1604 is a hypervisor running on system hardware or a virtual machine (VM) monitor (e.g., VMware) running on a host operating system running on top of system hardware. In one embodiment, each partition may be assigned its own VM monitor.

In accordance with an embodiment, monitor program 1604 selects for a particular partition one or more address translation structure formats to be used to translate a memory address from a guest physical address to a host physical address. The selection may be the same or different for each partition. Further, the selection may be based on, for instance, the translation formats available in the configuration, the type of applications to be run, the condition of memory (e.g., fragmentation), etc. In particular, the monitor program selects a translation structure format based on the following:

1) Implementation Level of Processor: When a translation mechanism is requested, but not available, another mechanism is substituted. For instance, legacy support is provided to provide support between schemes.
2) Configuration Override File: An override file includes instructions to ignore certain configuration choices or to map to alternative schemes. This is helpful in dealing with buggy implementations or optimizations, etc.
3) Configuration File: The configuration file is specified that indicates the particular format to be used for a partition.
4) OS Request: The operating system (OS) requests a specific translation mode based on its applications, for a specific region of memory or for all the memory.
5) Dynamic Optimizer/Application Characteristics: A dynamic optimizer determines the best translation property based on memory access characteristics. It may be a stand-alone component or integrated in one or more of the hypervisor, operating system or application (e.g., Just-in-Time).
6) Statically: A static preference for translation schemes based on schemes available in an implementation. In one implementation, when a system supports a newer translation scheme, the newer translation scheme is selected transparently for all partitions. In one implementation, when a system supports a new translation scheme, the legacy translation scheme is selected transparently for the partitions.

Figure 16B:
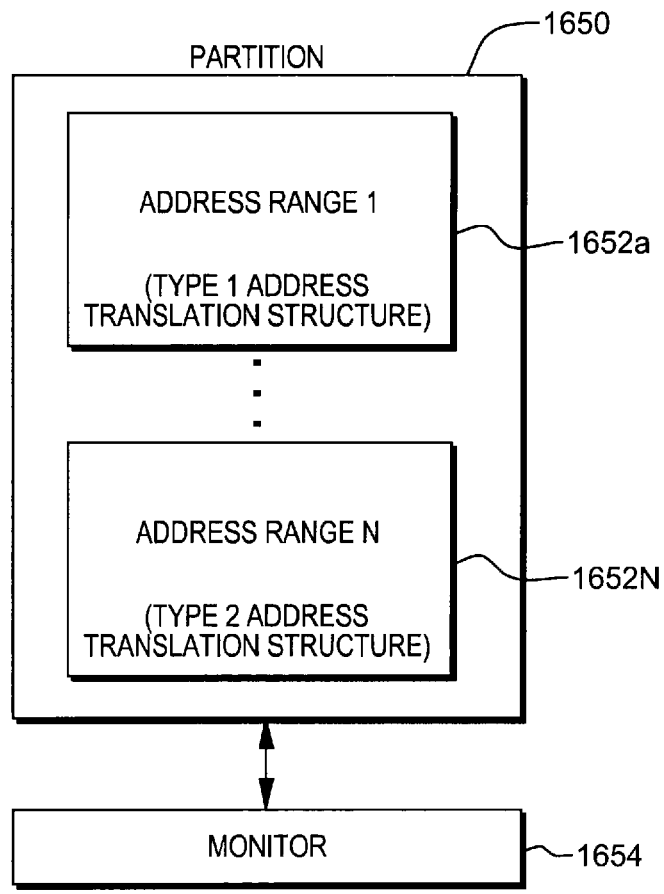
FIG. 16B depicts one example of multiple translation mechanisms for multiple address ranges of a single partition.

In addition to the above, address translation structure formats are selectable for different memory regions within a partition. For instance, as shown in FIG. 16B, a partition 1650 has assigned thereto a plurality of address ranges 1652*a* . . . 1652*n*. A monitor program 1654 selects for each address range one or more translation structure formats to be used for translating guest physical addresses to host physical addresses. The selection criteria is similar to that descried above for the partitions.

Figure 17:
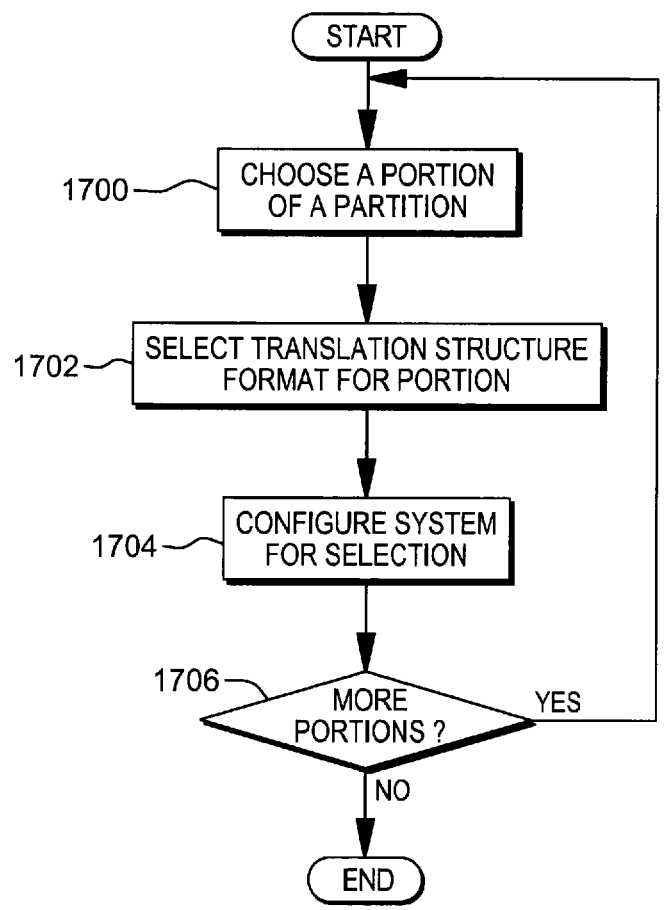
FIG. 17 depicts one example of the logic to configure a system for selected translation mechanisms.

One embodiment of the logic for selecting and configuring a system for selectable translation structure formats for partition portions (or full partitions) is described with reference to FIG. 17. Initially, a portion (e.g., address range) of a partition is selected, STEP 1700. Then, a translation structure format (e.g., hierarchical, radix, hash, or offset mechanism) is selected for the portion based on one or more of the criteria described above, STEP 1702. The system is then configured with the selection by, for instance, setting an indicator in a memory location or a register, STEP 1704. In another embodiment, the system is configured using an instruction that indicates the translation to be used, such as a Set Translation to n instruction, where n is a particular translation mechanism. In at least one embodiment, multiple indicators are present representing multiple selections of translation schemes for supporting host translation for a partition. In at least one such embodiment, at least one of the multiple indicators specifies a start address of an address range, an end of an address range and a translation scheme used. In at least one other embodiment, at least one of the multiple indicators specifies an address range based on an address prefix and an implementation-specified or indicator-specified mask, and a translation scheme used.

In one embodiment, if the monitor is not running directly on the hardware but under a supervisor (e.g., operating system control or a control system), the monitor uses a hypervisor call (HCALL) or operating system call to request the supervisor to configure the system. As examples, the call is made by accessing a memory location which causes a trap/notification to the supervisor, or an instruction is issued and interrupted by the supervisor, possibly with hardware support, such as a priority protection scheme limiting access to certain instructions to a higher privilege level of software.

Thereafter, if there are additional portions for which a translation format is to be selected, INQUIRY 1706, processing continues to STEP 1700. Otherwise, processing is complete. Similar processing is performed to select translation formats for full partitions, instead of or in addition to, the partition portions.

In one aspect, a processor supports the concurrent operation of multiple partitions on a single processor. In such an environment, in at least one embodiment, each partition is enabled to support the selection of a separate guest translation system independently of other partitions. In one embodiment, this selection is made directly by the operating system (OS) using a hardware mechanism, such as a "set translation instruction" and/or writing to at least one control register and/or writing to at least one memory location. In another embodiment, selection is performed by way of interacting with a hypervisor, either by having the hypervisor intercept and perform on behalf of the OS one of the described mechanisms, or by performing an HCALL or other explicit communication to the hypervisor.

In one aspect, a processor supports the concurrent operation of multiple guest translation processes for structurally different translation mechanisms. In accordance with such an embodiment, a first page table translation technique operates on behalf of a first partition requesting a first guest address translation using a first set of configuration values corresponding to the first partition, and a second page table translation technique operates on behalf of a second partition requesting a second guest address translation using a second set of configuration values corresponding to the second partition.

In one aspect of an embodiment, the host translation schemes are structurally similar for structurally dissimilar guest translation systems. In one such embodiment, only one set of configuration mechanisms are present for a host translation system. In another aspect of an embodiment, the host translation schemes are structurally dissimilar for structurally dissimilar guest translation systems. In one such embodiment, multiple configuration mechanisms are present for a host translation system.

In one aspect, a processor supports the concurrent operation of multiple partitions on a single processor. In such an environment, in at least one embodiment, each partition is enabled to support the selection of a separate host translation system independently of other partitions. In one embodiment, this selection is made directly by the hypervisor using a hardware mechanism, such as a "set translation instruction" and/or writing to at least one control register and/or writing to at least one memory location. In another embodiment, selection is performed by way of interacting with a control system, a controlling operating system, or other control program, either by having the control program intercept and perform on behalf of the hypervisor one of the described mechanisms, or by performing an call to the control system by the hypervisor.

In one aspect, a processor supports the concurrent operation of multiple host translation processes for structurally different translation mechanisms. In accordance with such an embodiment, a first page table translation technique operates on behalf of a first partition requesting a first host address translation using a first set of configuration values corresponding to the host translation of the first partition, and a second page table translation technique operates on behalf of a second partition requesting a second host address translation using a second set of configuration values corresponding to the second partition.

Although, in one embodiment, settings herein have been described in reference to entire partitions, multiple portions of partitions can use structurally dissimilar translation systems.

Figure 18:
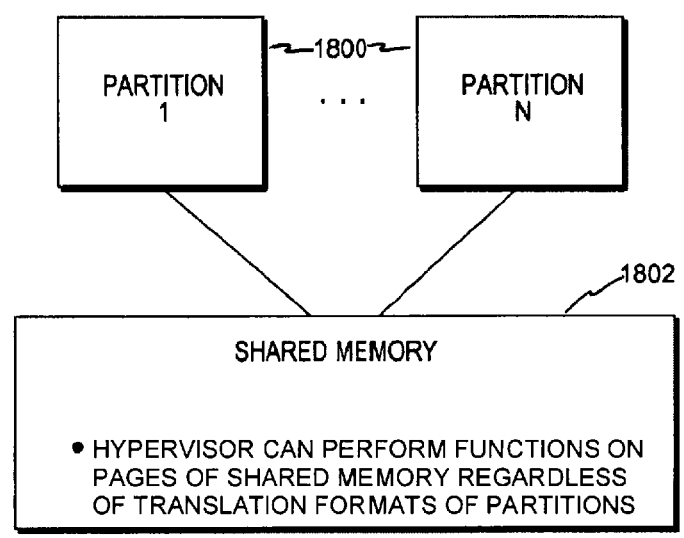
FIG. 18 depicts one example of multiple partitions that use heterogeneous translation formats sharing memory.

In one embodiment, partitions with differing translation structure formats are able to share memory. As shown in FIG. 18, a plurality of partitions 1800 share memory 1802. In this example, the partitions use structurally different translation formats (e.g., one or more use a hash structure and one or more use a hierarchical structure) to translate guest physical addresses to host physical addresses. Although the partitions may use different structure formats, pages of memory can still be shared between the partitions.

In another aspect, pages are shared between partitions when the partitions use structurally different host translation systems.

In one embodiment, the hypervisor supporting the partitions manages the shared memory, including removing a page from the shared memory; storing a page of the memory in another memory, such as storage class memory; paging out a page of the memory; and/or compressing a page of the memory, as examples. Further, the hypervisor can determine that a page of memory is duplicated in both partitions and remove one of them, so that the remaining page is shared. As used herein, a page of memory refers to a unit of memory of a predefined size.

Additionally, the hypervisor may clone a partition to provide shared pages of memory. This includes, for instance, creating a new partition, copying the configuration file of the partition being cloned, creating a new host translation table to be used for the cloned partition, and for each page in the cloned partition, pointing to the respective page in the original partition while indicating that the pages should be copy-on-write, allowing the partitions to proceed independently of one another.

With a copy-on-write function, if one partition wants to write to a page of memory that is shared transparently, the page is set to read-only access by the hypervisor, and when an access violation indicating a write to the subject page is indicated by memory access techniques implemented in the processor, the hypervisor gains control by way of an indication event. The hypervisor then creates a copy of the shared page for the partition requesting to modify its version of the shared page by way of a memory write to a transparently shared page, and makes the partition's private copy of the formerly shared page writeable. The hypervisor then restarts the instruction having caused the violation, and the instruction proceeds and writes to that page which is now unshared and writeable. This is also supported, even when the partitions have differing address translation architectures (e.g., differing address translation structure formats).

Described in detail above are aspects in which multiple types of translation structures are included in a configuration. In one embodiment, it is selectable as to which translation mechanism(s) may be used to translate an effective address to a host real address. However, if the system configuration does not support such a feature or if it supports that feature, as well as legacy translation techniques, then legacy translation is provided.

Figure 19:
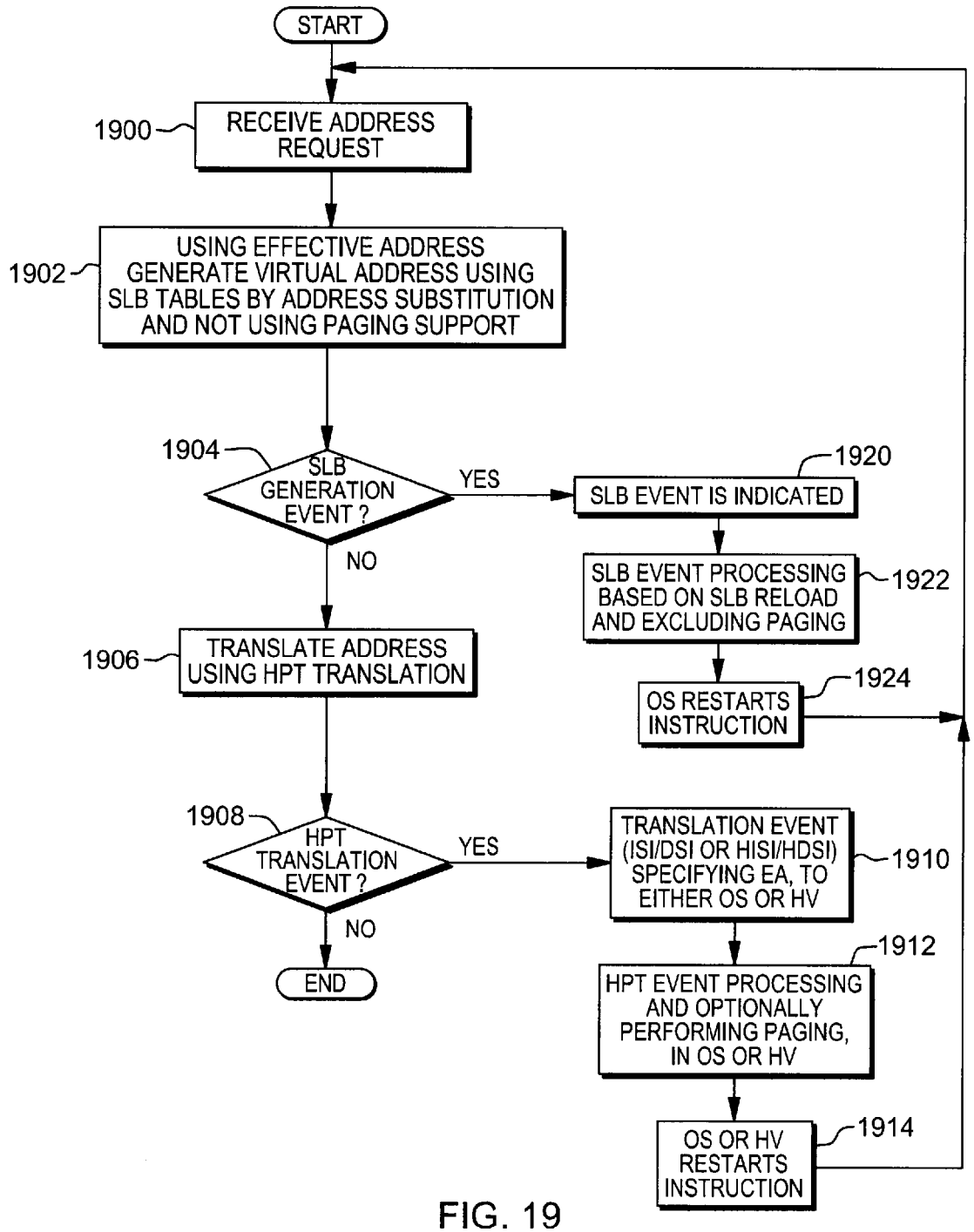
FIG. 19 depicts one example of a hash page table translation mechanism.

One embodiment of the logic of a legacy translation technique in which a hash page table is used is described with reference to FIG. 19. Initially, an address request is received that includes an effective address, STEP 1900. The effective address is used to generate a virtual address, STEP 1902. For instance, the ESID is used to locate an SLBE, which includes a VSID. The VSID combined with the page.byte of the effective address provides the virtual address to be translated. Thus, the virtual address is created by address substitution (referred to herein as segmentation) and not using paging support. Thereafter, a determination is made as to whether there is an SLB address generation event, INQUIRY 1904. For instance, was there a miss in the SLB when looking for the ESID? If not, then the virtual address is translated to a real address using conventional HPT translation, STEP 1906. A determination is made as to whether there is a translation event, INQUIRY 1908. If there is no HPT translation event, then processing is complete, and the real address can be used to access memory.

Returning to INQUIRY 1908, if there is an HPT translation event, then the translation event is specified to either the operating system or hypervisor using, for instance, ISI/DSI or HISI/HDSI, STEP 1910. HPT event processing is performed, including optionally performing paging, STEP 1912. The operating system or hypervisor restarts the instruction, STEP 1914, and the flow returns to STEP 1900.

Returning to INQUIRY 1904, if there is an SLB generation event, then an SLB event is indicated to the operating system, STEP 1920. Further, SLB event processing is performed including, for instance, reloading the SLB (excluding paging), STEP 1922. The operating system restarts the instruction, STEP 1924, and processing continues with STEP 1900.

Figure 20:
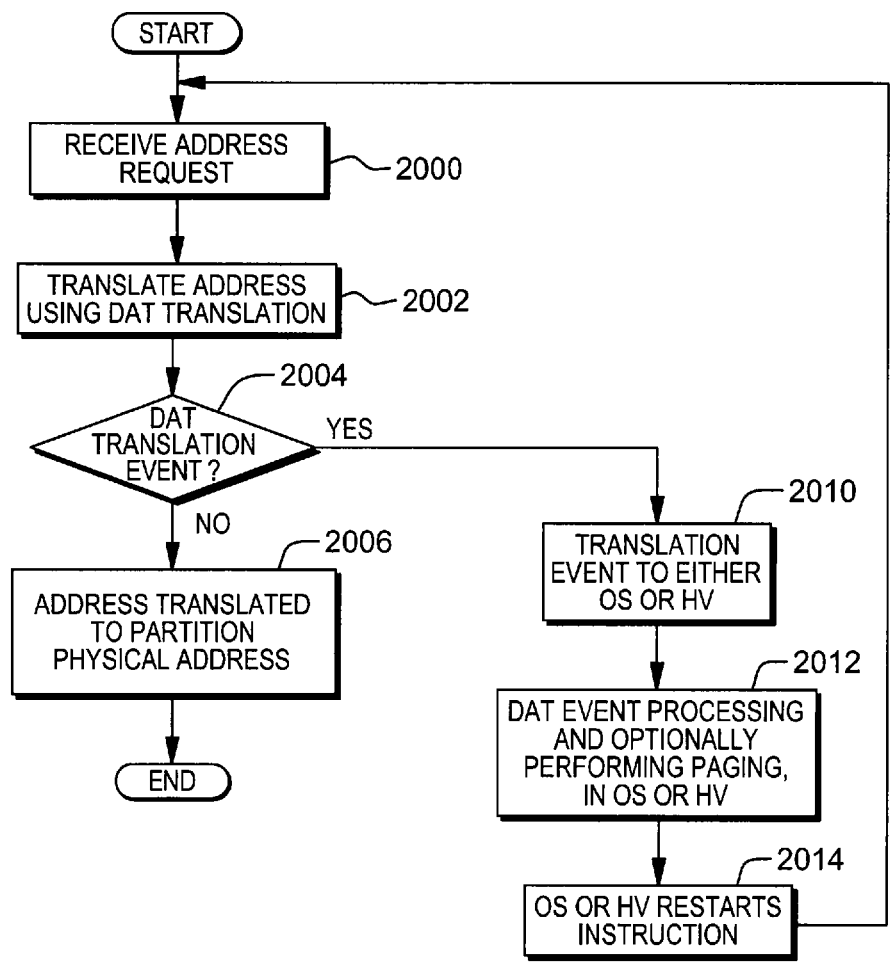
FIG. 20 depicts one example of a dynamic address translation (DAT) mechanism.

A further legacy technique for translating memory addresses is described with reference to FIG. 20. This technique uses a hierarchical translation mechanism. Initially, an address request is received, STEP 2000. The address is translated using, for instance, DAT translation, STEP 2002, which is similar to the hierarchical translation described herein. One example of an architecture that uses DAT translation is the z/Architecture, which is described in an IBM Publication entitled "z/Architecture—Principles of Operation," Publication No. SA22-7932-08, 9$^{th}$ Edition, August 2010, which is hereby incorporated herein by reference in its entirety. Thereafter, a determination is made as to whether there was a DAT translation event, such as a miss, INQUIRY 2004. If not, then the address has been translated to a physical address, STEP 2006, and processing is complete.

However, if there is a DAT translation event, INQUIRY 2004, then the translation event is either indicated to the operating system or hypervisor, STEP 2010. DAT event processing is performed in the operating system or hypervisor; optionally, performing paging, STEP 2012. Further, the operating system or the hypervisor restarts the instruction, STEP 2014, and processing continues to STEP 2000.

Described in detail above is a configuration that includes multiple types of translation structures (e.g., multiple types of paging data structures) to translate an effective address to a real address. In one example, one type of structure is accessed to obtain an origin of another type of structure. Although examples of translation mechanisms are described, additional and/or different mechanisms may be used. In one embodiment, it is selectable as to which translation mechanism(s) may be used to translate an effective address to a host real address. In one example, a first address (e.g., a guest virtual address) is translated to a second address (e.g., a guest physical address) using a scheme selected from, for instance, radix translation, other hierarchical translation, segmentation (e.g., using SLB), hash page table or a combination of the above, as examples. The second address is translated to a third address (e.g., a host physical address) using a translation scheme selected from one or more of page level schemes (translation schemes other than offset mechanisms); radix mechanisms; other hierarchical mechanisms; hash mechanisms; or offset mechanisms, as examples.

In one embodiment, the third address (e.g., host physical address) corresponds to an address executing in a hypervisor partition executing under control of another level of virtualization. That is, the third address is yet another virtual address to be translated to a physical address. The translation is performed as above, and the translation mechanisms are again independently selectable.

Further, in one embodiment, a guest/host configuration is provided in which multiple partitions have differing translation mechanisms associated therewith. For instance, one partition has associated therewith a single level translation mechanism for translating guest virtual addresses to host physical addresses, and another partition has a nested level translation mechanism for translating guest virtual addresses to host physical addresses. Additionally, in one embodiment, operating systems that support a single level of translation may first generate a guest virtual address from an effective address using, for instance, an SLB. In yet a further embodiment, a processor identifier or address space identifier might be used to further specify a guest virtual address.

For nested level translation partitions, in one embodiment, the hypervisor creates a partition with a linear translated address space using a hash page table or another host translation architecture. The host table input for a partition ranges from 0x0000 to 0xMAXX. This translation is used as a second level of translation once a first level of translation is performed in the guest from a guest virtual address to a guest physical address. In one embodiment, the partition is not using HENTER/HREMOVE to manage replacements or updates to the host table. Instead, the hypervisor manages replacement of host table entries transparently when entries need to be updated/replaced in the host table. For each guest physical address to host physical address range, the hypervisor maintains a mapping to the host physical address. When a host table miss occurs, the hypervisor transparently loads the host translation table.

Additionally, in one aspect, a configuration is provided that enables a paravirtualized hypervisor to support different types of partitions, including those that expect the hypervisor to provide full virtualization (e.g., partitions that use nested translations) and those that use paravirtualization (e.g., partitions that use single level translation). An adjunct component is provided that installs the linear address space needed by a fully virtualized partition. It is packaged as a component that interacts with the hypervisor to install translations needed by a virtualized partition. The actual code can be included with the hypervisor, partition firmware, or operating system, but is segregated and distinct from the hypervisor and/or the operating system in terms of program logic. In embodiments, the adjunct component may run either in hypervisor or operating system privilege. If packaged with the hypervisor, although separate therefrom, it still has certain security trustworthiness, and therefore, less security checks need to be made when transferring control to the adjunct component.

In one example, the adjunct component creates a linear translated address space by allocating partition memory (e.g., using HPTs, or other host translation architecture). An address range input for a partition ranges from 0x0000 to 0xMAXX. This translation is used as a second level of translation once a first level of translation is performed in the guest from a guest virtual address to a guest physical address. The adjunct component uses HENTER to either pre-install translations, or install translations responsive to translation misses. The adjunct component manages replacement of HPTs (or other structures) transparently when entries need to be updated/replaced in the HPT (or other structures). For each guest address range, the adjunct component maintains a mapping to a host physical address. When an HPT (or other) miss occurs, the adjunct component transparently to the operating system loads the HPT (or other structure). To facilitate full-virtualization support, the hypervisor uses an adjunct component that can be included with the hypervisor or with the partition, and the adjunct component handles a fault on behalf of the hypervisor and the unsuspecting partition.

In one embodiment, in accordance with a VM monitor architecture, a hypervisor can use two different types of guest physical to host physical translations. For example, HPT may be selected for dense translation areas (large contiguously mapped areas), and radix or other hierarchical tables may be selected for scattered partitions, and to exploit locality without large contiguous areas. In accordance with one or more aspects, when a monitor program manages multiple partitions, it can select a translation mechanism for each one, or portions thereof, separately. When running under an operating system (OS) or under a control system, multiple instances of a monitor can execute independently, each one selecting a translation system independently. When running under an operating system or control system, the monitor may not be able to configure a translation system directly, but may perform a configuration request to the OS or control system. The OS will be adapted to configure and support multiple translation systems.

In one embodiment, a system configuration is provided that includes a first partition configured to support an operating system (OS) designed for a first address translation architecture (e.g., using one type of address translation structure formats), the first partition not supporting an OS designed for a second address translation architecture (e.g., using another type of address translation structure formats); and a second partition configured to support the OS designed for the second address translation architecture, the second partition not supporting the OS designed for the first address translation architecture, wherein the first address translation architecture is structurally different from the second address translation architecture.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 21:
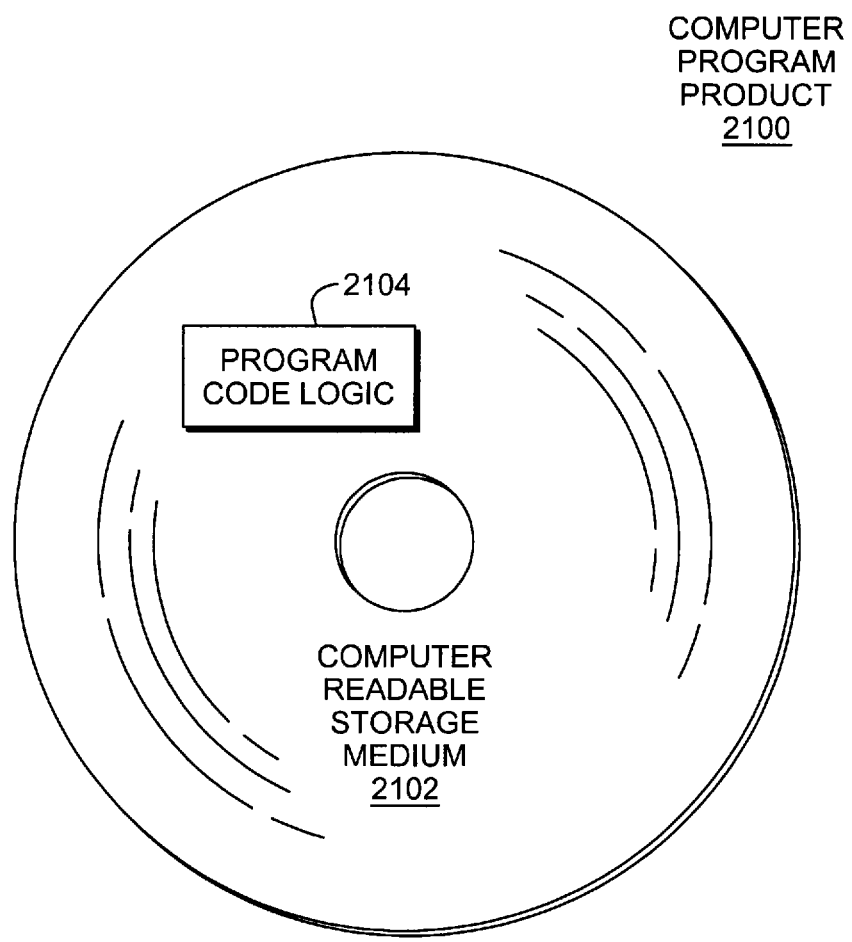
FIG. 21 depicts one embodiment of a computer program product incorporating one or more aspects.

Referring now to FIG. 21, in one example, a computer program product 2100 includes, for instance, one or more non-transitory computer readable storage media 2102 to store computer readable program code means or logic 2104 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects of the present invention. As one example, the deploying of an application comprises providing computer infrastructure operable to perform one or more aspects of the present invention.

As a further aspect, a computing infrastructure may be deployed comprising integrating computer readable code into a computing system, in which the code in combination with the computing system is capable of performing one or more aspects of the present invention.

As yet a further aspect, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, other types of translation structures may be used and other types of environments may benefit from one or more aspects. Additionally, each structure may have different fields and/or the fields can be of different sizes. Further, the number of bits used to index into a structure can be the same or different for each level, and/or for each structure. Additionally, in another embodiment, a different type of structure (e.g., a hierarchical structure or other structure) may be used to find the base origin (i.e., virtual real address) of another structure (e.g., a hash structure or other structure). Other possibilities exist. Further, one or more aspects may pertain to I/O. Many variations are possible.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain various aspects and the practical application, and to enable others of ordinary skill in the art to understand the various embodiments with various modifications as are suited to the particular use contemplated.

What is claimed is:

1. A method of facilitating memory access, said method comprising:
    providing a first partition within a system configuration, the first partition configured to support an operating system (OS) designed for a first address translation architecture, wherein configuration of the first partition to support the OS designed for the first address translation architecture is indicated in configuration information in a configuration data structure, and wherein the first partition is not configured support an OS designed for a second address translation architecture;
    providing a second partition within the system configuration, the second partition configured to support the OS designed for the second address translation architecture, wherein configuration of the second partition to support the OS designed for the second address translation architecture is indicated in the configuration information in the configuration data structure, wherein the second partition is not configured to support the OS designed for the first address translation architecture, and wherein the first address translation architecture is structurally different from the second address translation architecture;
    based on obtaining, as part of an address translation request of the first partition or second partition, an address for translation, determining, based on the configuration information in the configuration data structure, an address translation architecture to use to translate the address; and
    translating the address via the determined address translation architecture.

2. The method of claim 1, wherein the first address translation architecture is for handling address translation requests of the first partition and the second address translation architecture is for handling address translation requests of the second partition.

3. The method of claim 1, wherein the first address translation architecture uses a hash structure and the second address translation architecture uses a hierarchical table structure.

4. The method of claim 1, wherein the first partition uses a single level address translation mechanism for translating guest virtual addresses to host physical addresses, and the second partition uses a nested level address translation mechanism for translating guest virtual addresses to host physical addresses.

5. The method of claim 4, wherein the nested level address translation mechanism includes a first translation structure to translate a guest virtual address to a guest physical address and a second translation structure to translate the guest physical address to a host physical address.

6. The method of claim 5, wherein the first translation structure comprises one of a hierarchical structure, a hash structure or an offset structure, and the second translation structure comprises one of a hierarchical structure, a hash structure or an offset structure.

7. The method of claim 1, wherein the first partition and the second partition are supported by a single hypervisor.

8. The method of claim 1, further comprising sharing memory by the first partition and the second partition, wherein the memory is shared by the first partition and the second partition which use structurally different address translation architectures.

9. The method of claim 8, further comprising managing by a hypervisor supporting the first partition and the second partition the memory that is shared, wherein the managing includes at least one of: removing a page from the memory, storing a page of the memory in another form of memory, paging out a page of the memory, or compressing a page of the memory.

10. The method of claim 1, further comprising cloning one of the first partition and the second partition to provide memory to be shared by multiple partitions using structurally different address translation architectures.

11. The method of claim 1, further comprising:
    identifying a page of memory that is the same in the first partition and the second partition; and
    removing the page from one of the first partition and the second partition, wherein the page that remains is shared by the first partition and the second partition.

12. The method of claim 1, wherein the configuration data structure indicates at least one of a type of address translation structure to be used for host level translations or an indication of whether the first partition is to use a single level translation or a nested level translation.

* * * * *